US006438713B1

(12) United States Patent
Taira et al.

(10) Patent No.: US 6,438,713 B1
(45) Date of Patent: Aug. 20, 2002

(54) DEBUGGER FOR SUPPORT OF DEBUGGING OF PROGRAM, ARRAY DATA DISPLAYING METHOD IN DEBUGGER, AND RECORDING MEDIUM HAVING ARRAY DATA DISPLAYING PROGRAM IN DEBUGGER

(75) Inventors: Keigo Taira, Kawasaki; Kazunori Watanabe; Yoichi Irie, both of Yokohama; Tsuyoshi Endo, Fujisawa; Kenya Aoyagi, Yokohama; Saori Mitsunaga, Kawasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/258,303

(22) Filed: Feb. 26, 1999

(30) Foreign Application Priority Data

Feb. 27, 1998 (JP) .......................... 10-046740
Feb. 27, 1998 (JP) .......................... 10-046743

(51) Int. Cl.[7] .............................................. G06F 11/30
(52) U.S. Cl. .................................... 714/38; 717/125
(58) Field of Search ................... 714/38, 57; 717/124, 717/125, 126, 127, 128, 129, 132, 133

(56) References Cited

U.S. PATENT DOCUMENTS

| 5,530,942 A | * | 6/1996 | Tzou et al. | 395/147 |
|---|---|---|---|---|
| 5,652,909 A | | 7/1997 | Kodosky | 395/800 |
| 5,884,016 A | * | 3/1999 | Allen et al. | 395/119 |
| 5,926,638 A | * | 7/1999 | Inoue | 395/704 |
| 5,987,248 A | * | 11/1999 | Murayama et al. | 395/704 |
| 6,003,143 A | * | 12/1999 | Kim et al. | 714/38 |
| 6,046,752 A | * | 4/2000 | Kirkland et al. | 345/505 |

FOREIGN PATENT DOCUMENTS

| JP | 363103360 A | * | 5/1988 | | G06F/15/02 |
|---|---|---|---|---|---|
| JP | 403091005 A | * | 4/1991 | | G05B/19/05 |
| JP | 5-120249 A | | 5/1993 | | |
| JP | 5-274178 A | | 10/1993 | | |
| JP | 5-334119 A | | 12/1993 | | |
| JP | 6-59928 A | | 3/1994 | | |
| JP | 7-200351 A | | 8/1995 | | |

OTHER PUBLICATIONS

C. Pancake, Debugger Visualization Techniques for Parallel Architectures, Visiting Scientist of Cornell Theory Center, Dept. of Computer Science and Engineering, 1992, IEEE, Publication Date Feb. 24, 1992, pp. 276–284.

* cited by examiner

*Primary Examiner*—Scott Baderman
(74) *Attorney, Agent, or Firm*—Antonelli, Terry, Stout & Kraus, LLP

(57) ABSTRACT

A debugger for support of the debugging of a program, an array data displaying method in the debugger, and a recording medium having an array data displaying program in the debugger are disclosed. A debugger system may be provided with a data save unit and a display control unit so that a command is issued to a source program at a breakpoint to save array data. Next, an instruction for display of the saved data is made to display the data on a display unit. Thereby, the contents of an array can be saved without changing a source and the saving and display of array data can be performed asynchronously. Also, the debugger system may be provided with an array construction control unit, a shared element control unit and a display element sampling unit so that an array distributed to a plurality of processes is constructed by the array construction unit and is displayed in the form of a graph with the trimming performed by the display element sampling unit down to the proper number of elements. Thereby, in the debugging of a multi-process program, the grasp of the whole of an array distributed to each process can be facilitated.

21 Claims, 26 Drawing Sheets

DATA DISPLAY WINDOW 91

```
tmopen data 1 tmnext
  a[1]=1.0
  a[2]=2.0
    •
    •
  a[n]=30.0
tmselect
  1 ARRAY•a ROW NUMBER•20 TYPE•double SAMPLING INSTANT OF TIME• wed nov 12 15:00:00
  2 ARRAY•b ROW NUMBER•50 TYPE•int SAMPLING INSTANT OF TIME• wed nov 12 15:02:31
    •
    •
  100 ARRAY•c ROW NUMBER•300 TYPE•int SAMPLING INSTANT OF TIME• wed nov 12 15:33:37
select no. : 100
  c[1]=100
  c[2]=50
    •
    •
  c[n]=25 tmsave data 1_now
```

211 ARRAY NAME
212 ROW NUMBER
213 DATA TYPE
214 SAMPLING INSTANT OF TIME
215 ARAY VALUE

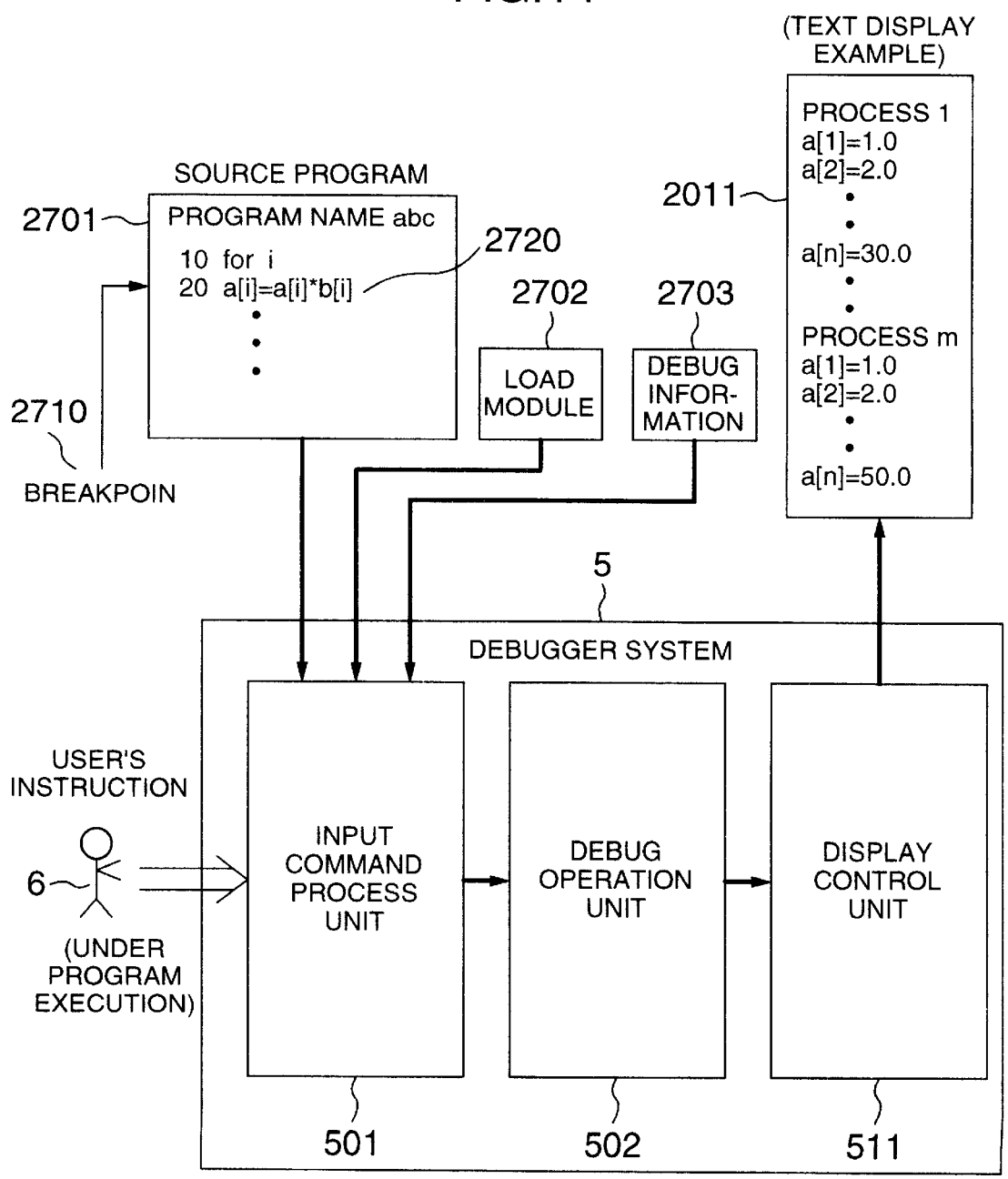

FIG.23
EXAMPLE OF ROW DIRECTION PREFERRED DIVISION
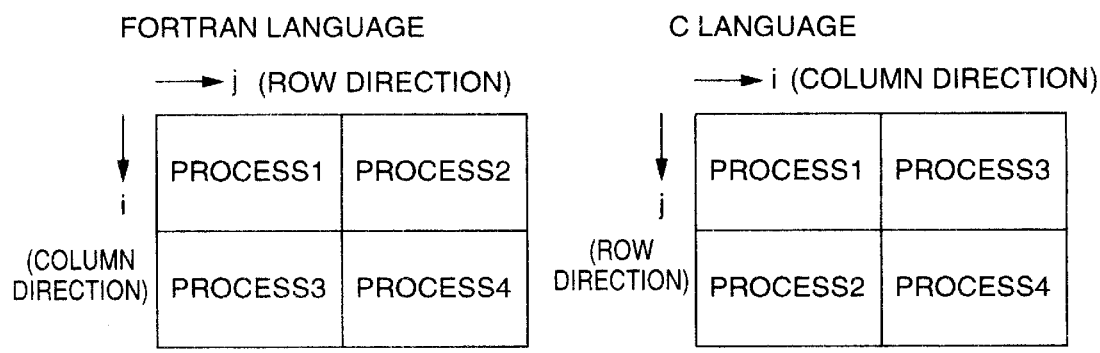
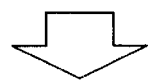
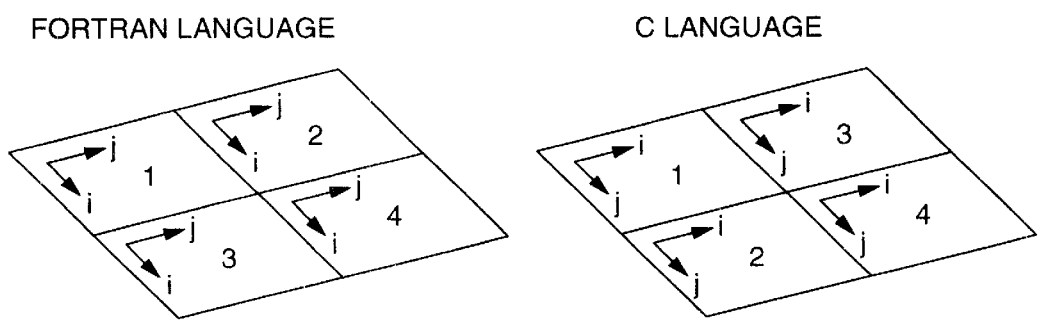

FIG.24
EXAMPLE OF COLUMN DIRECTION PREFERRED DIVISION 2021
FORTRAN LANGUAGE
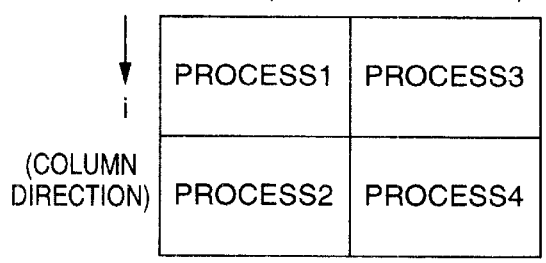
C LANGUAGE
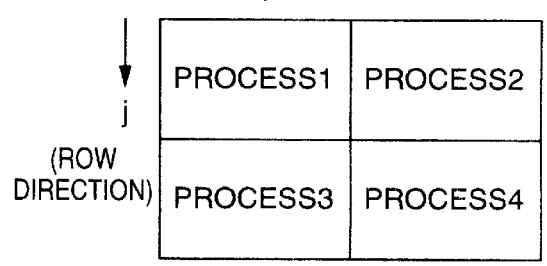
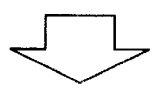
FORTRAN LANGUAGE
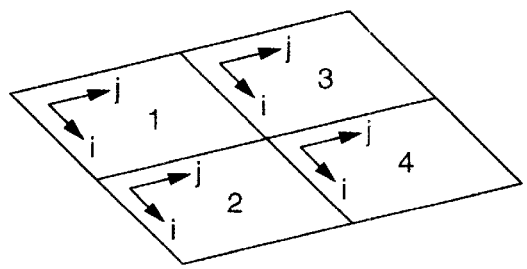
C LANGUAGE
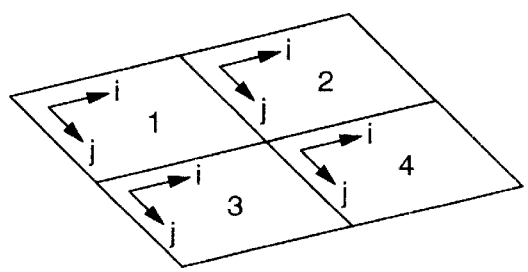

FIG.25
EXAMPLE OF ARIBITRARY DIVISION IN FORTRAN PROGRAM
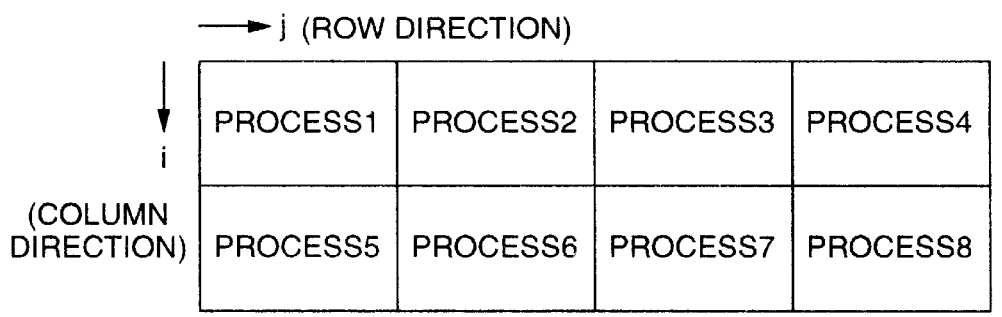
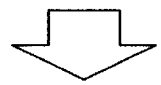
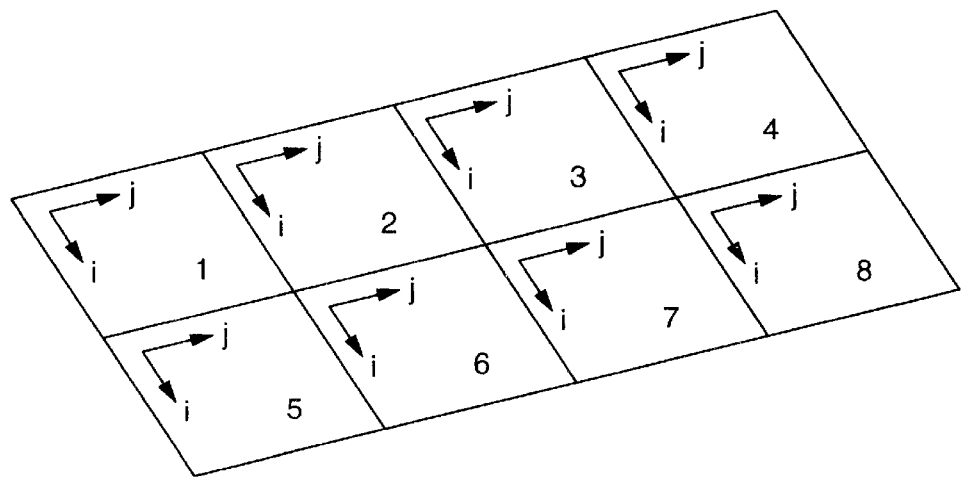
FIG.26

DEBUGGER FOR SUPPORT OF DEBUGGING OF PROGRAM, ARRAY DATA DISPLAYING METHOD IN DEBUGGER, AND RECORDING MEDIUM HAVING ARRAY DATA DISPLAYING PROGRAM IN DEBUGGER

BACKGROUND OF THE INVENTION

The present invention relates to a debugger for support of the debugging of a program, an array data displaying method in the debugger, and a recording medium having an array data displaying program in the debugger, and more particularly to the debugging of a program with which array data is saved and displayed and the debugging of a multi-process program with which an array distributed to each process is constructed and displayed.

In the prior art of the debugging of a program, means for saving array data referred to a method in which after a sentence or statement for writing array data into a memory such as a file is inserted into a source, a program is re-executed so that the array data is saved. Also, there is a method in which the reference to array data is made without changing a source, that is, a method in which a debugger is used so that array data at the present point of time is displayed at a breakpoint while a program is executed. Further, there is the case where an OS is constructed so that a memory dump is outputted at the time of abnormal completion of a program. The contents of the memory dump can be saved as a dump file. Array data is displayed by passing the dump file through a debugger.

However, the above-mentioned prior art has the following problems. Namely, the saving of array data into a memory such as a file requires that a statement for writing array data into the memory should be inserted into a source. This is accompanied with a danger that an erroneous source change may be made when the statement is inserted at the time of debugging and when it is deleted after debugging. In the method in which a debugger is used with no source change, the debugging is possible only in the case where a program is executed or in the case where a program is abnormally completed. In particular, for a program such as a structure analysis program requiring a long executing time, it is difficult of repeated execution and a problem arises in the aspect of debugging efficiency. Further, the conventional debugger is capable of only the reference to array data at the present breakpoint (or at a point of time of progression of a program which is being executed) and is not provided with means for saving the array data. Therefore, it is not possible to refer to array data at the time of break or interruption before the present breakpoint. In particular, it is difficult to compare the previous contents and the present contents. Also, in the case where a memory dump is outputted, a large amount of data other than a desired array exists and hence the saving of such data causes a problem in the aspect of resource. Further, since the memory dump is outputted only when a program is abnormally completed, this method is unavailable in the case where the program is normally completed.

In the prior art of the debugging of a program distributed to a plurality of processes, means for referring to the whole of a distributed array includes a method in which the distributed array data is displayed as separate arrays corresponding to the respective processes. Also, means for constructing an array distributed to a plurality of programs into an array before distribution includes a method in which a program to be debugged is once completed following the writing of array data of each process into a memory such as a file, and a program for constructing the array data written in the memory into one array is peculiarly generated by a user so that the array data is constructed into an array before distribution and the constructed array is displayed. Further, a method of displaying the values of elements in an array of a single process or in distributional arrays includes a method in which the values of all elements in a designated array(s) are displayed in the form of a text or in the form of a graph.

However, such prior art has the following problems. Namely, since array data distributed to a plurality of processes is capable of only the reference to as separate arrays, there is a problem that it is not possible to grasp the whole of the distributed array at once. Also, the system for constructing distributional arrays into one array through the generation of another program requires that a program to be debugged should be completed once. Therefore, this system has a problem that the efficiency of debugging is poor. Further, in the case where a large amount of data is to be displayed in the form of a graph, the display of all array data in a display screen area or display window makes the displaying rate low. In this case, there is a problem that it is not possible to display all data in one display screen area.

SUMMARY OF THE INVENTION

A first object of the present invention is to provide the debugging of a program with which the contents of array data at a desired row in the program are saved into a file without changing a source and the saved array data is displayed on occasion. A second object of the present invention is to provide the debugging of a multi-process program (or parallel program) with which the efficiency of debugging is improved by automatically constructing a distributed array at a desired row in a program to be debugged and displaying the constructed array in the form of a graph at a high speed.

To attain the first object of the present invention, data saving means for saving the contents of array data at a breakpoint into a file for the saving of array data (hereinafter referred to as array data save file) in time series is provided in a debugger system. Thereby, the saving of any array data at any breakpoint is possible irrespective of whether the program is normally completed or abnormally completed. Also, the saving of a resource as compared with the case of a memory dump is possible since unnecessary information is removed so that only any necessary array data can be saved.

To attain the first object, data displaying means for fetching the saved array data from the array data save file and displaying it on occasion may be provided in the debugger system. The data displaying means is operated as a process separated from and asynchronously with the data saving means to enable the occasional display under program execution or after the completion of program execution. With this construction, the previously displayed array can be displayed on occasion under program execution, thereby improving the efficiency of debugging. Also, array data sampled at the time of program execution can be displayed on occasion after the completion of program execution, thereby improving the efficiency of debugging.

To attain the first object, selecting means for facilitating the selection of an array to be displayed from an array name, a sampling instant of time and/or the like for the saved array data and facilitating maintenance including the deletion, copy and/or the like of the saved array data may be provided in the data displaying means. With the provision of the selecting means, the display of array data can be performed in such a manner that desired array data can easily be selected. Also, the maintenance including the deletion, copy and/or the like of the saved array data can be facilitated. Thereby, user's convenience is afforded.

A file format of the array data save file is defined as means for effectively realizing the first object and as means for effective realization in a plural-process system such as a parallel computer.

To attain the first object, data compressing means for reducing the amount of data of the array data save file by lowering the accuracy in numeric value of an array value may be provided in the data saving means. Thereby, in a large scale array requiring the use of a large amount of a resource such as a disk, the further saving of the resource is possible in the case where no problem is provided even if the display is made with the accuracy in numeric value lowered at an initial stage of debugging, at the time of graph display, and so forth.

To attain the first object, CSV (Comma Separated Valve) format file generating means for converting any array data in the array data save file into CSV format data may be provided in the debugger system. Thereby, the saved array data can be utilized by another application.

The first object can be achieved in accordance with a procedure shown in the following.

(1) Using the debugger system, a user executes a program to be debugged. At this time, a breakpoint is designated to a row of the program to be subjected to sampling.

(2) The program is progressed up to the desired breakpoint. When the program reaches the breakpoint, a data save command is issued with the designation of array data to be saved.

(3) The operation of (2) is also repeated for other breakpoints.

(4) A file in which an array to be displayed is saved is designated in a data display window or by a display command so that the saved array data is displayed on a display unit in the sequence of saving.

(5) When an instruction for outputting the array data of the save file to a CSV format file is made, the saved array data is outputted to the CSV format file which is based on a standard format.

In the present invention, the data saving means and the data displaying means are operated asynchronously with each other. Therefore, no problem is provided even if simultaneous access to the array data save file is made by the data saving means for the writing of data and by the data displaying means for the reading of data. Accordingly, it is possible to perform the operation of (3) on occasion from a point of time of completion of the operation of (2).

The above provides an effect that the reference to array data sampled at a breakpoint before the present breakpoint can be made by the user under program execution and the reference to array data sampled at the time of program execution can be made by the user after program completion.

To attain the second object of the present invention, array constructing means for constructing array data distributed to a plurality of processes and graph displaying means for displaying the constructed array data in the form of a graph are provided in a debugger system. With this construction, the distributed array is automatically constructed into an array before distribution and the constructed array is displayed in the form of a graph, thereby making it possible to shorten a time required for the verification of data.

To attain the second object, language type discriminating means for discriminating the type of a language of a program to be debugged may be provided in the array constructing means. Thereby, the difference in arrangement of an array on a memory depending on the type of the language of the program to be debugged is automatically discriminated so that when the array after construction is displayed in the form of a graph, a user is not required to be conscious of the difference in language.

To attain the second object, the graph displaying means may be provided with shared portion checking means for checking whether or not shared portions between distributional arrays are correct and check result graph displaying means for graphically displaying the result of check by the shared portion checking means. With this construction, whether or not the shared portions between the distributional arrays are correct is checked to detect an abnormality in the whole of the array, thereby making it possible to immediately verify whether or not the performed calculation is correct. Also, a time required for specifying an incorrect location is reduced by displaying the result of check in the form of a graph.

To attain the second object, means for monitoring a program to be debugged may be provided for monitoring the passage of the program through a breakpoint and the updating of a designated array to inform the graph displaying means of the passage and the updating. With this construction, the graph of an array being displayed is automatically updated each time a predesignated breakpoint is passed and each time the designated array is updated. Thus, a change in array is displayed in time series, thereby making it possible to immediately know which point of time was incorrectness generated at.

To attain the second object, the graph displaying means may be provided with display element sampling means by which elements to be subjected to graph display are sampled from array data. With this construction, the graph display is performed in such a manner that if only normal values are included in the range of trimming, a means value thereof is determined and displayed whereas if an abnormal value is included in the range of trimming, the abnormal value is preferentially displayed. Thereby, the graph is displayed at a high speed with data being automatically trimmed without deforming the graph. Therefore, the efficiency of debugging is not lowered even in the case of a large amount of data. Also, it is possible to enlarge the graph partially, thereby reducing a time required for specifying an incorrect location.

To attain the second object, the display element sampling means may be provided with data sampling rule setting means for designating a rule for sampling when the elements to be subjected to graph display are sampled from the array data. With this construction, the designation of a rule for trimming becomes possible and the selection of data trimming conformable to the characteristic of a program to be debugged becomes possible. Thereby, it is possible to remove a harmful influence caused by the trimming of unnecessary data.

The second object can be achieved in accordance with a procedure shown in the following.

(1) Using the debugger system, a user executes a program to be debugged. At this time, a breakpoint is designated to a row of the program to be subjected to graph display.

(2) The program is progressed up to the desired breakpoint. When the program reaches the breakpoint, array data to be subjected to graph display is designated. Then, an array of each process is automatically constructed and the constructed array is displayed in the form of a graph on a display unit.

(3) When the check of portions shared between distributional array data of the respective processes is designated, the result of check of the shared portions between the distributional array data is displayed in the form of a graph on the display unit.

(4) A breakpoint to be subjected to monitoring and an array to be monitored are designated beforehand. Thereby, when the breakpoint is passed or when the array is updated, a graph being displayed on the display unit is updated.

(5) A rule for trimming is designated to change elements which are to be displayed as a graph on the display unit and elements which are not to be displayed.

(6) A graph displayed on the display unit is designated by a pointing unit such as a mouse or an element number is designated, so that array data in the vicinity of the designated element is displayed in an enlarged form.

Thus, a distributed array is automatically constructed and the constructed array is displayed in the form of a graph so that the condition of the array at a designated point of time can be confirmed as a graph. Thereby, the debugging can effectively be performed. Also, since the value of array data is monitored and the graph is updated when the condition of array data changes, it is possible to know that row on a program to be debugged at which the contents of array data are updated, thereby making it possible to effectively perform the debugging. Further, when a large amount of array data including a large number of elements is to be displayed in the form of a graph, the graph display is performed at a high speed with elements trimmed but the displayed graph maintains a form before trimming. Further, since a rule for trimming can be defined, a user's intended trimming can be performed, thereby making it possible to effectively perform the debugging.

BRIEF DESCRIPTION OF THE DRAWINGS

FIG. 14 is a diagram for explaining operations in an example of the debugger;

FIG. 23 is a diagram for explaining the case where an array is subjected to block type division with the row direction preferred for the allotment to processes;

FIG. 24 is a diagram for explaining the case where an array is subjected to block type division with the column direction preferred for the allotment to processes;

FIG. 25 is a diagram for explaining the case where when an array is divided into blocks, the number of divisional blocks in the row direction and the number of divisional blocks in the column direction are arbitrarily designated;

FIG. 26 is a diagram for explaining a shared element option window using GUI;

DESCRIPTION OF THE PREFERRED EMBODIMENTS

Embodiments of the present invention will now be described using the drawings.

Figure 1:
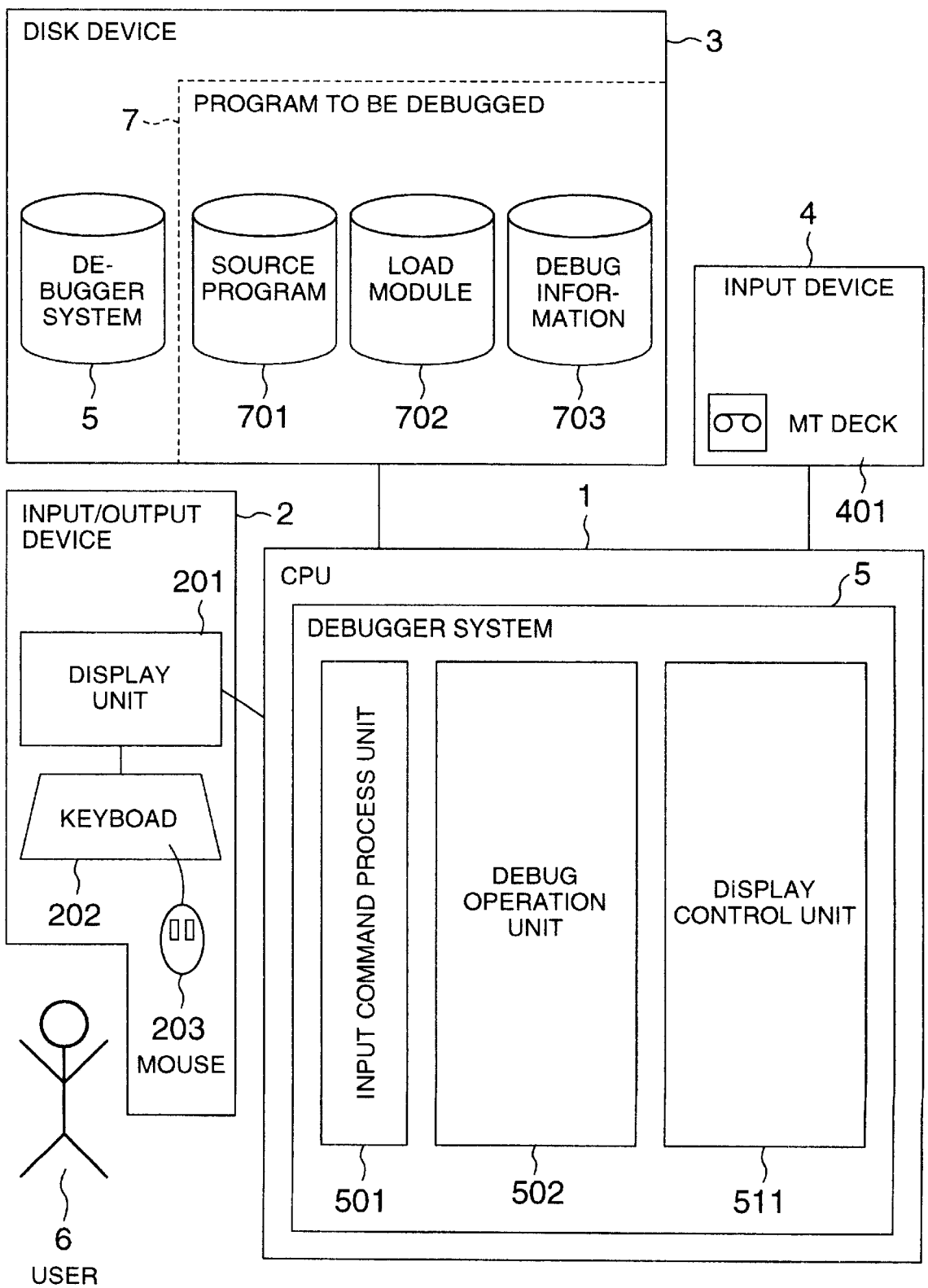
FIG. 1 is a diagram showing the system construction of an example of the debugger.

FIG. 1 shows an example of the system construction of the debugger. A CPU 1 is provided with an input/output device 2, a disk device 3 and an input device 4. The input/output device 2 includes a display unit 201 such as a display and input units including a keyboard 202 and a mouse 203. The disk device 3 is constructed by a magnetic disk or the like and is provided for storing a program and data therein. The input device 4 is constructed by an MT deck 401 or the like and is provided for inputting a program and data stored in a medium such as a magnetic tape, a magnetic disk or the like. A debugger system 5 is a program which is provided to a consumer by use of a medium such as a magnetic tape. The program is stored into the disk device 3 by use of the input device 4. When a user 6 starts the debugger system, the debugger system is loaded onto the CPU 1. The debugger system 5 is composed of an input command process unit 501 for accepting an instruction from the user, a debug operation unit 502 for performing a processing in accordance with the instruction, and a display control unit 511 for displaying a menu window and the result of processing.

Figure 2:
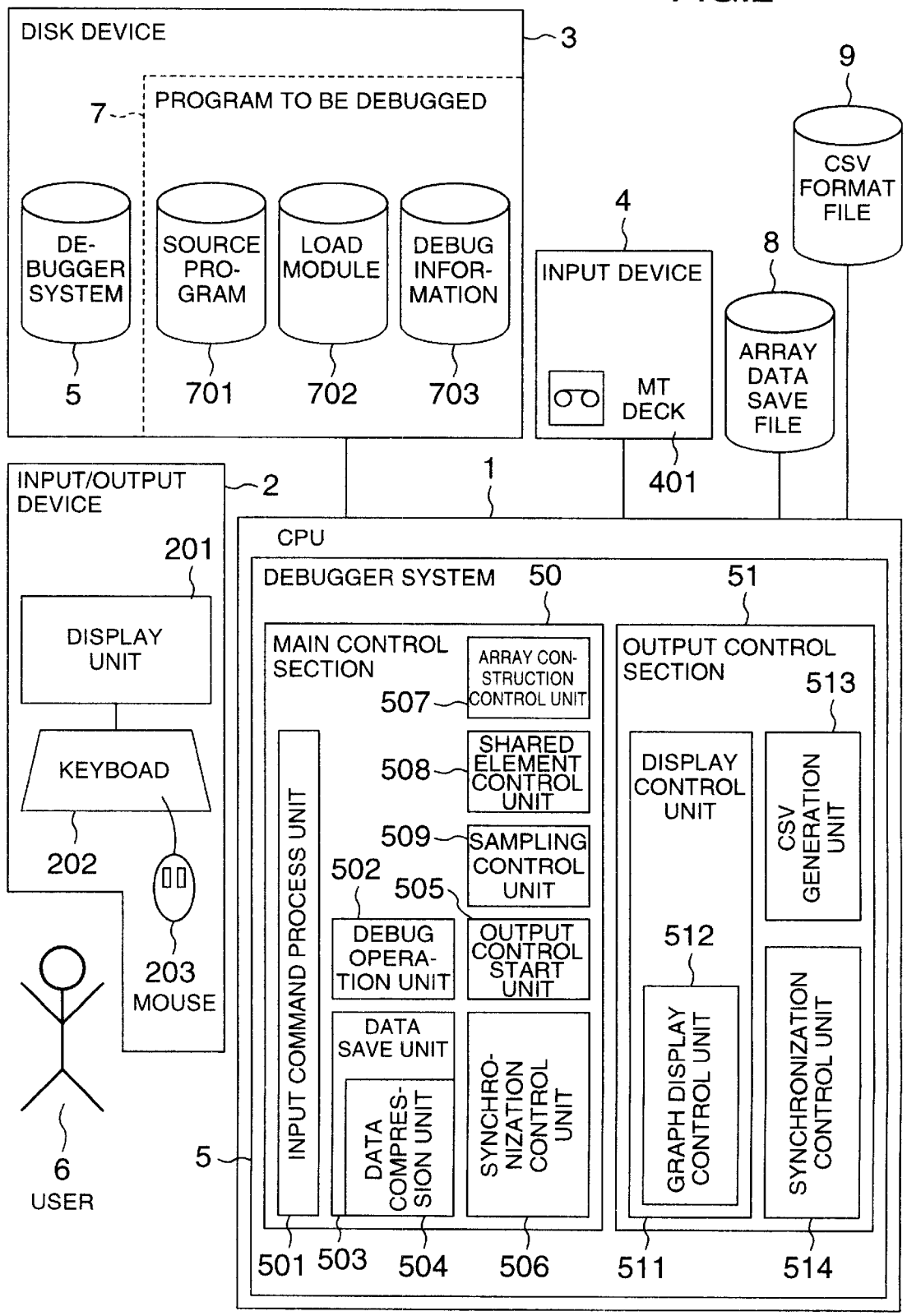
FIG. 2 is a diagram showing an example of the system construction of a debugger according to the present invention.

FIG. 2 shows an example of the system construction of a debugger according to the present invention in which the addition/change is made for the system construction shown in FIG. 1. Great difference from the construction of FIG. 1 based on a first aspect of the present invention lies in that the debugger system 5 is divided into a main control section 50 for performing the control of the whole of the system and a debug processing function other than a display processing and an output control section 51 for effecting the display of the result of processing and various outputs, and that an array data save file 8 and a data save unit 503 in the main control section 50 are provided as means for saving array data in time series. Difference based on a second aspect of the present invention lies in that an array construction control unit 507, a shared element control unit 508 and a sampling or trimming control unit 509 are provided in the debugger system 5, and that a graph display control unit 512 is provided in the display control unit 511.

Figure 3:
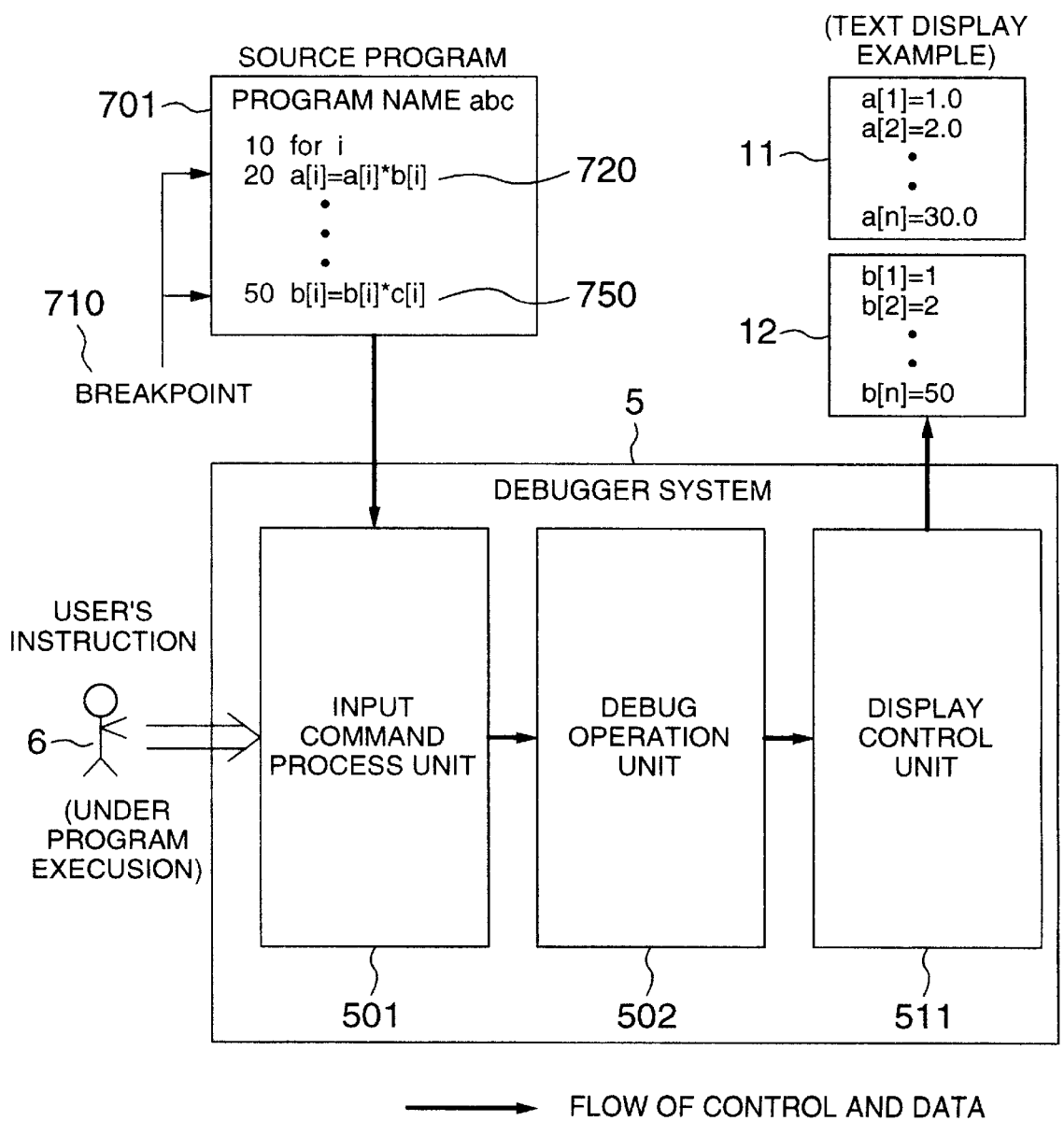
FIG. 3 is a diagram for explaining operations in the example of the debugger.
Figure 4:
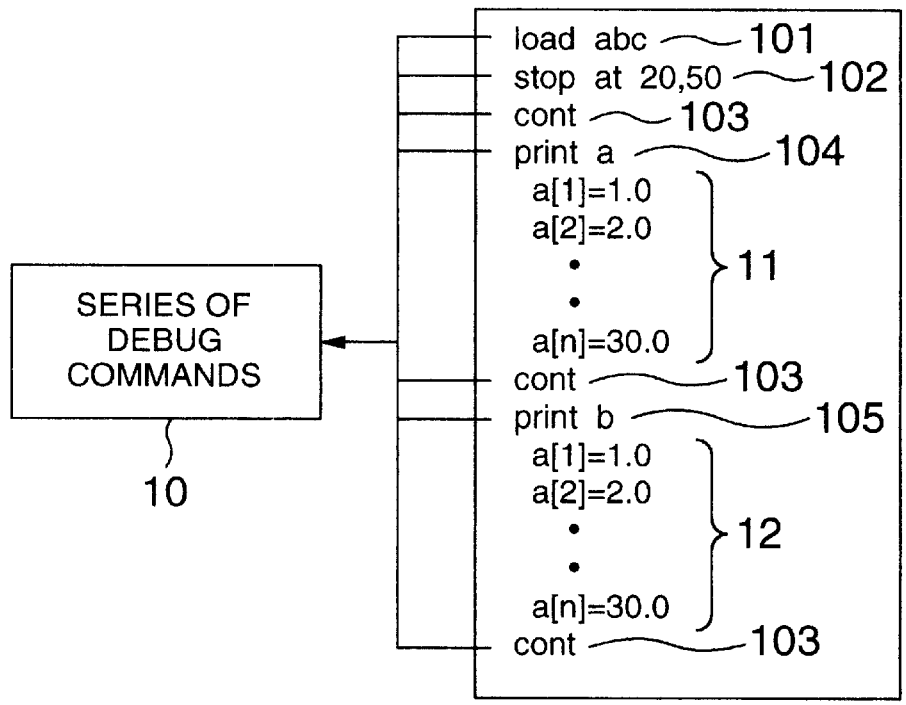
FIG. 4 is a diagram for explaining a display window showing an example of debug commands in the debugger and an example of the result of execution of the commands.

A first embodiment of the present invention will now be described. Prior to the description of the first embodiment, an example of operations performed when a source program 701 is debugged by use of the conventional debugger will be described using FIGS. 1, 3 and 4. FIG. 3 shows the flow of control and data in the debugger system 5 in an example of the debugger, and FIG. 4 shows an example of debug commands inputted by the user 6 from the keyboard 202 or the like and the result of execution of the commands.

When a program is to be debugged, the user 6 inputs a series of debug commands 10 to debug the program in the following sequence.

(1) A load module 702 corresponding to a source program 701 of a program 7 to be debugged is loaded so that the program is brought into an executable condition. The corresponding command for this purpose is a command 101.

In operation of the debugger at this time, the input command process unit 501 receives the command 101. In accordance with the instruction of the command 101, the debug operation unit 502 inputs the source program 701 of the program 7 to be debugged, the load module 702 and debug information 703 generated by a compiler, thereby preparing for execution.

(2) In the source program 701, breakpoints 710 are first set to the 20th row 720 and the 50th row 750 of the source program in order to refer to the contents of an array. The corresponding command is a command 102.

In operation of the debugger at this time, the input command process unit 501 receives the command 102 and the debug operation unit 502 saves breakpoint information.

(3) Next, the program is executed up to the set breakpoint 710. The corresponding command is a command 103.

In operation of the debugger at this time, the command 103 is received by the input command process unit 501 so that the program is executed up to the breakpoint 710 with the reference to the breakpoint information saved in the operation of (2).

More particularly, the debugger executes the program up to the 20th row upon reception of the first command 103 and up to the 50th row upon reception of the second command 103.

(4) At the 20th row 720, the contents of an array a are displayed. The corresponding command is a command 104. Similarly, a command for displaying the contents of an array b at the 50th row 750 is a command 105.

In operation of the debugger at this time, the commands 104 and 105 are received by the input command process unit 501 so that the reference to the contents of the designated arrays is made from the load module 702 and the debug information 703 inputted in the operation of (1). The contents referred to are displayed on the display unit 201 such as a display by display control unit 511. Display result examples 11 and 12 correspond to the representation of the contents of the arrays a and b as character strings, respectively.

In the first embodiment of the present invention, on the other hand, the debugger 5 is provided with the data save unit 503 and the array data save file 8 as means for saving the contents of array data so that the array data can be saved in time series. The term of time series indicates the sequence of instructions for the saving of array data made instead of the instructions for display by the above-mentioned commands 104, 105, - - - .

In many cases of the debugger, the whole of the debugger system is constructed as one process. In the present embodiment, on the other hand, the main control section 50 and the output control section 51 are provided as separate processes so that they can operate asynchronously with each other.

Figure 6:
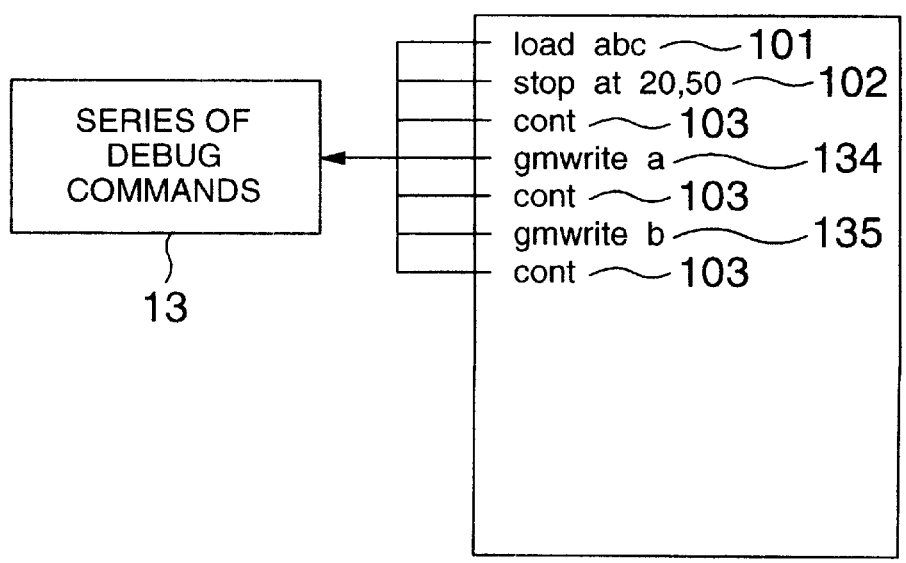
FIG. 6 is a diagram for explaining a display window showing an example of debug commands for the saving of array data in the embodiment.

An example of operations performed in the present embodiment will be described using FIGS. 2, 5 and 6.

Operations similar to the above-mentioned operations of (1) to (4) are performed. In conjunction with the operation of (4), however, the operation in the conventional debugger is such that the contents of array data are immediately displayed whereas the operation in the present embodiment is such that the contents of array data are once saved into the array data save file 8. In the present embodiment, a user 6 inputs a series of commands 13 shown in FIG. 6. Instructing commands 101 to 103 in the debug commands 13 are the same as the instructing commands 101 to 103 in the debug commands 10 shown in FIG. 4 and the same operations are performed by the debugger.

Commands 134 and 135 are examples of commands for saving the contents of array data instead of displaying them. In the shown example, new commands are added in distinction from commands in the debugger. It is of course that the addition of new commands can be substituted by a method in which newly added arguments for the commands 104 and 105 are used or a method in which the optional designation of arguments at the time of debugger start and environmental variables, menus or the like is made.

Next, an example of a processing for displaying array data saved in the array data save file 8 will be described using FIGS. 2, 5 and 7 to 9.

The user 6 can select any one of array data displaying means (1) and (2) as follows:

(1) display in a display window using GUI; and
(2) CUI display in row of commands.

The detailed description will now be made of the case of display in the GUI window by the means (1).

When the debugger (or the main control section 50 in the present embodiment) is started under program execution or after program execution, the user 6 inputs that command 142 in commands 14 for starting a GUI data display window 15 which is shown in an example 141 when the debugger is started. In the debugger system 5, the control is transferred from the input command process unit 501 to an output control start unit 505 so that the output control section 51 is started. In the output control section 51, the control is transferred to a display control unit 511 in compliance with the instruction of the command 142 so that the GUI data display window 15 is displayed on the display unit 201.

In the case where the output control section 51 is directly started without starting the main control section 50, the user 6 inputs a command 146 which is shown in an example 145 when the debugger is not started.

Next, the description will be made of an operation when array data is displayed on a data display area 152 in the GUI data display window 15. Into a file select field 151 of the GUI data display window 15, the user 6 inputs a file name of the array data save file 8 in which an array to be displayed is saved. In the file select field 151, a file name of a predetermined standard is beforehand displayed as default. The display control unit 511 searches for the corresponding file on the basis of the inputted file name so that top data of array data saved in time series is displayed on the data display area 152. Contents displayed on the data display area 152 at this time are text display examples 11 and 12 (see FIG. 5). When the user 6 depresses a Next button 153, the display control unit 511 displays the next array data. When the Next button 153 is subsequently depressed, the further next array data is displayed.

Figure 5:
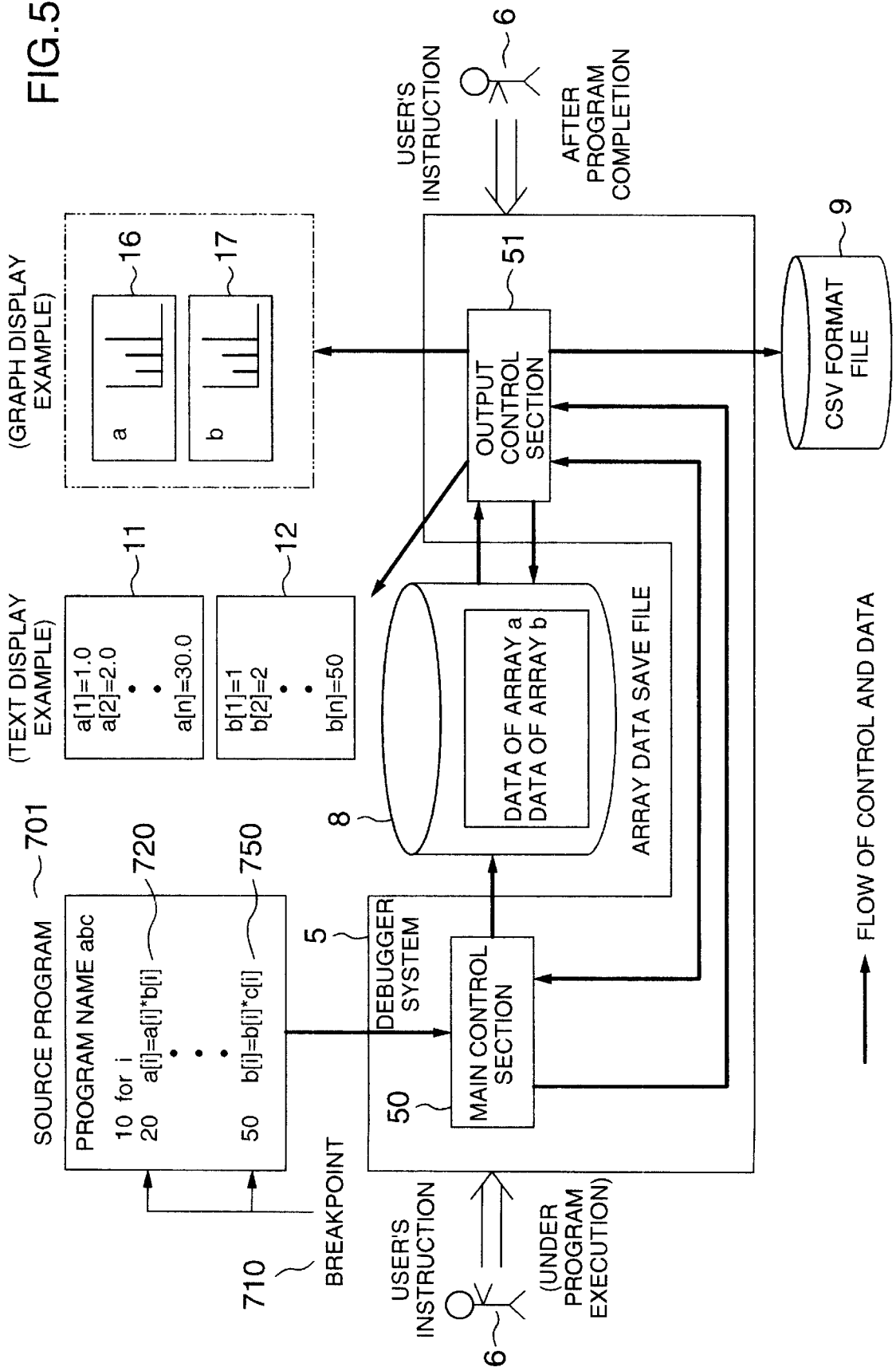
FIG. 5 is a diagram for explaining operations in a first embodiment of the present invention.

A graph display control unit 512 may be provided in the output control section 51, thereby making it possible to graphically display the contents of the text display examples 11 and 12, as shown by graph display examples 16 and 17 (see FIG. 5).

In order to afford convenience for the file management and/or reuse of the array data save file 8, a file save field 154 is provided in the GUI data display window 15 to enable the saving with any file name.

Figure 7:
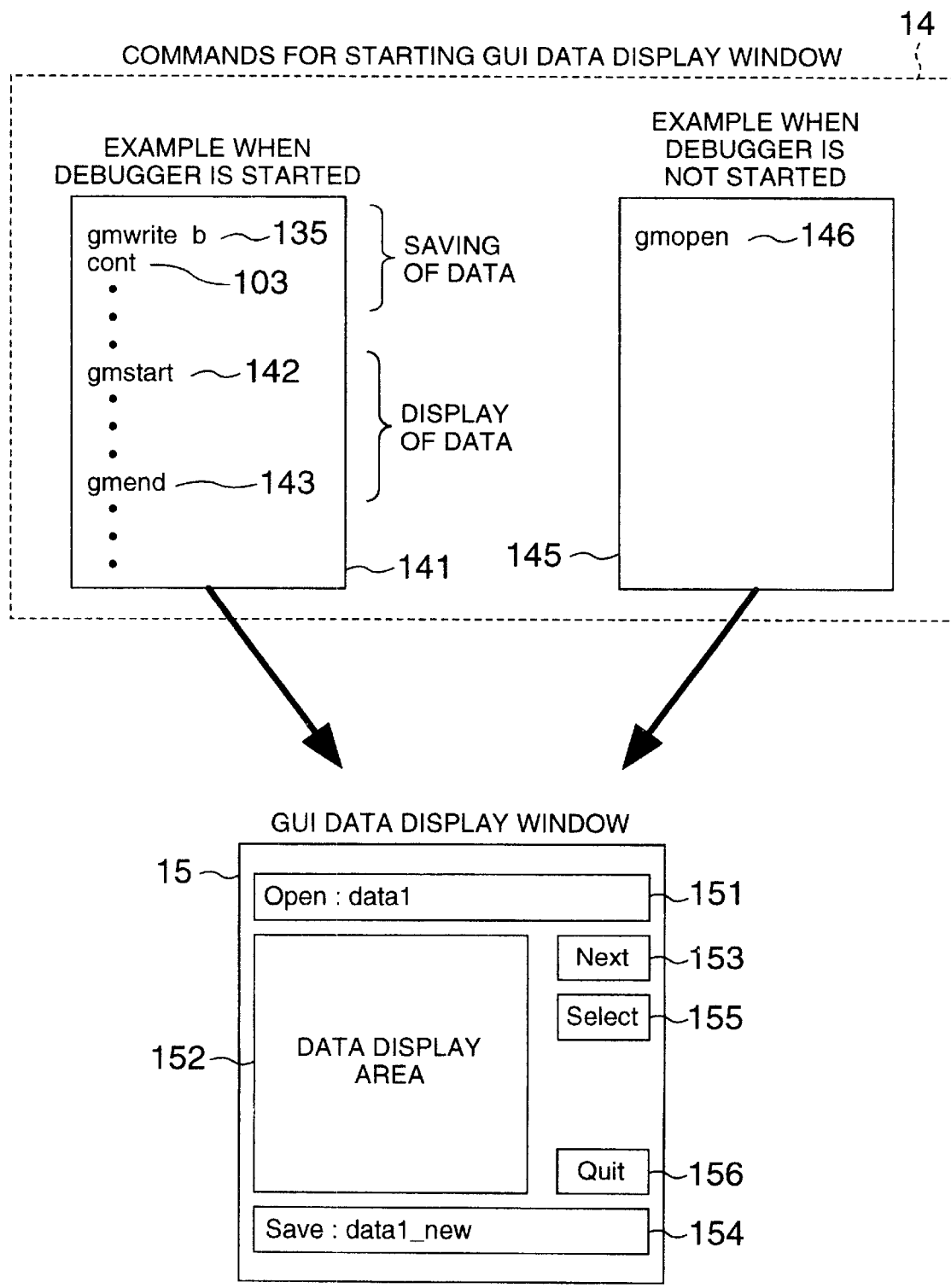
FIG. 7 is a diagram showing an example of a data display window using GUI and an example of commands for starting the data display window.
Figure 8:
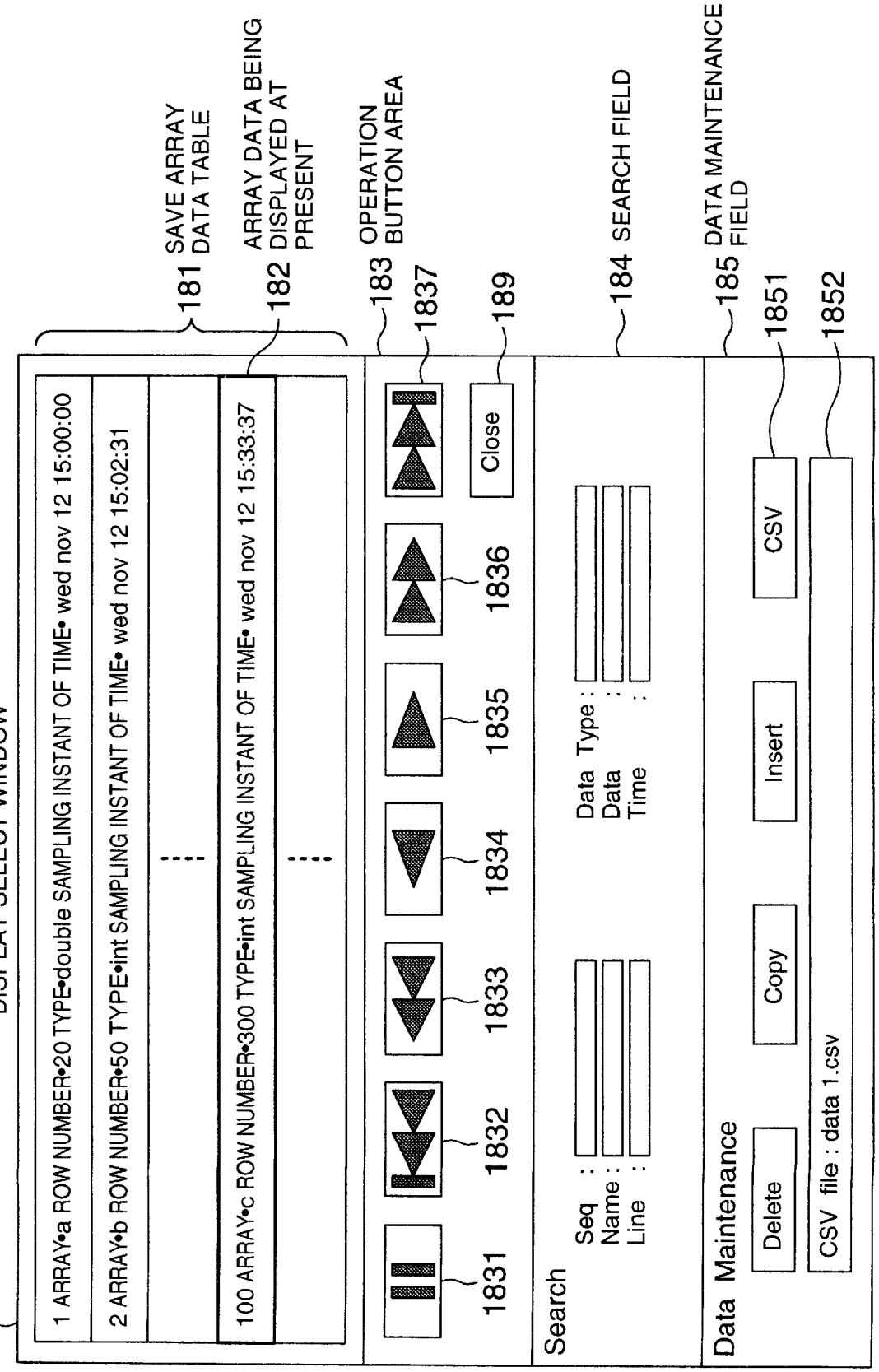
FIG. 8 is a diagram showing an example of a display select window using GUI.

Departure from the GUI display window 15 is made by depressing a Quit button 156 or inputting a command 143 from the row of commands 14 shown in FIG. 7.

The Next button 153 is merely provided for displaying the next data sequentially. It is inconvenient in the case where there is a large amount of data. Thus, a Select button 155 is provided in the GUI data display window 15, thereby affording convenience. When the Select button 155 is depressed, the display control unit 511 displays a display select window 18 shown in FIG. 8.

The display select window 18 is conveniently provided with a navigation function with which the search for any array data can easily be made and a maintenance function with which the maintenance of data is facilitated. Necessary items extracted from the array data save file 8 for indicating an epitome of saved array data are displayed in the form of a save array data table 181 on the window. The user 6 uses a mouse, keyboard or the like so that an array to be displayed is designated from the displayed save array data table 181. The contents of the designated array are displayed on the data display area 152. In order that data being displayed at present in the data display window 15 is known, the data is emphatically displayed in the save array data table 181. Further, an operation button area 183 including buttons 1834 and 1835 for sequentially displaying data before and after the array data 182 being displayed at present, buttons 1832 and 1837 for displaying the top and end of data, buttons 1833 and 1836 for continuous display in forward and rearward directions, and a button 1831 for temporal stop of the continuous display is provided to afford user's convenience.

Also, a search field 184 is provided in order to enable data search under various conditions.

Further, a data maintenance field 185 is provided to afford convenience for maintenance which includes the deletion of unnecessary data in the array data save file 8 and the copy and insertion of data.

Figures 9, 10:
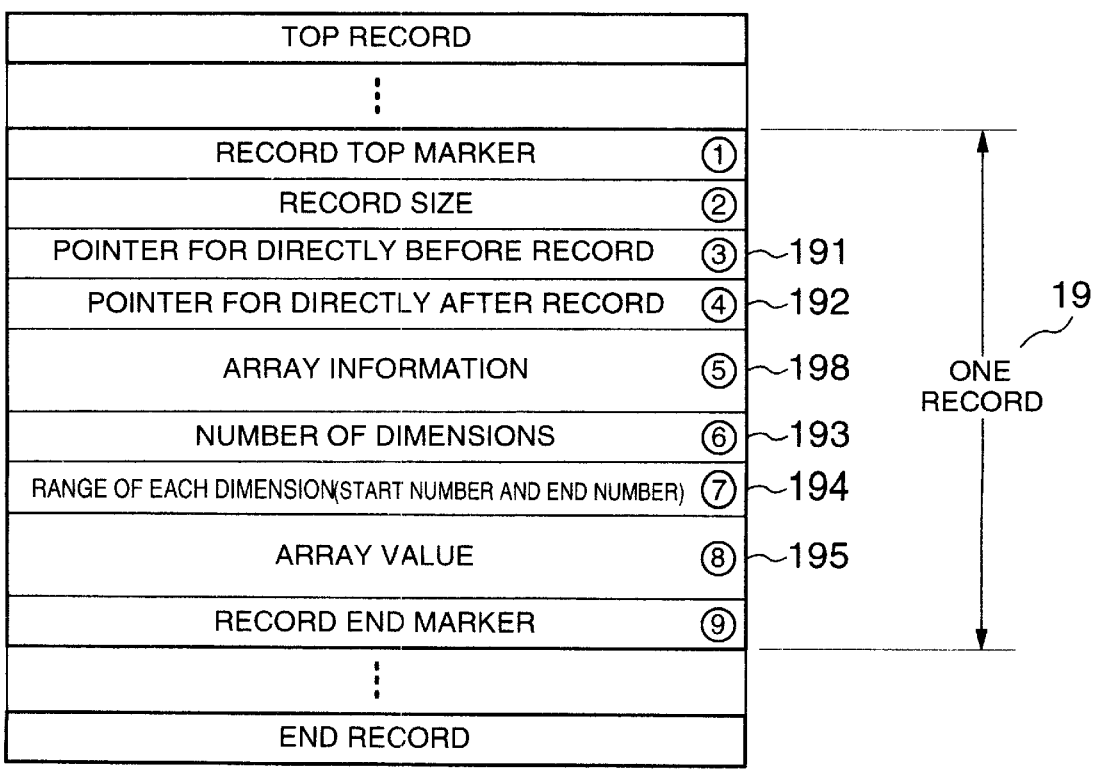
FIG. 9 is a diagram showing an example of a command window in the case where CUI is used.
FIG. 10 is a diagram showing an example of the format of an array data save file.

FIG. 9 shows an example in the case where a part of the above process is CUI (Character User Interface) displayed in the row of commands by use of the above-mentioned means (2). A function in this case is effective for a user who desires to perform all processings on a command base and a user who uses a character terminal. It is of course that the switching from a CUI data display window 91 to the GUI data display window 15 is possible at any time by inputting the command 142 shown in FIG. 7.

Since the main control section 50 and the output control section 51 are operated as separate processes, a processing for displaying saved data can be performed on occasion not only under execution of the program 7 to be debugged but also for the program having already been executed. Especially, under program execution, saved data at a breakpoint having already been passed can be displayed any times. Thereby, the efficiency of debugging is greatly improved.

It is of course that functions realized by the conventional debugger can be realized in the present invention. This is possible in either a configuration close to the conventional debugger in which data is directly transferred between the main control section 50 and the output control section 51 or a configuration in which synchronization control units 506 and 514 are respectively provided in the main control section 50 and the output control section 51 to enable the transfer of data through the array data save file 8 in a synchronized manner.

FIG. 10 shows an example of the format of the array data save file 8 and the contents of each item. A record top marker is a marker indicating the top of information acquired at one breakpoint. A record size indicates the size or length of the corresponding record. A pointer for directly before record 191 is a pointer indicating a top address of a record directly before the present record. A pointer for directly after record 192 is a pointer indicating a top address of a record directly after the present record. Array information 198 is that information such as information acquired at the breakpoint which is associated with an array. The array information includes, for example, array name, program name, row number, data type, sampling instant of time, compression code, and so forth. The number of dimensions 193 indicates the number of dimensions of the array. A range of each dimension 194 includes a start number and an end number indicating a range of elements saved in each dimension. An array value 195 indicates the value (or real data) of the array acquired at the breakpoint. A record end marker is a marker indicating the end of information acquired at the one breakpoint. The data save unit 503 operates so that array data subjected to instruction for the saving thereof at the breakpoint 710 is added as a one (1) record 19 into the array data save file 8. In the one record 19 is saved a part or all of the array data in accordance with the instruction of a save command which is executed by the user at the breakpoint 710. The contents of the record are read by the display control unit 511 so that they are displayed on the data display area 152 of the GUI data display window 15 and in the CUI data display window 91. In connection with this, the addition of the number of array dimensions 193 and the range of each dimension 194 (or the start number and the end number indicating a range of elements saved in each dimension) as items provides a merit that the determination of display construction of the data display area 152 of the GUI data display window 15 and the CUI data display window 91 is facilitated. Also, it is possible to provide a plurality of records as blocks so that a display window is formed for each block.

The pointer for directly before record 191 and the pointer for directly after record 192 are items provided for realizing the navigation function and the data maintenance function mentioned above.

The present example is shown in the form of sequential organization in a magnetic disk. However, another medium such as a magnetic tape can be used. Also, a memory can be used without using the medium. Further, it is possible to employ a file format such as the form of indexed sequential organization in which the combination of a row number and an array number related to the setting of the breakpoint 710 is used as an index or the form of partitioned organization in which such combination is used as a member name so that each record forms a member.

Figure 11:
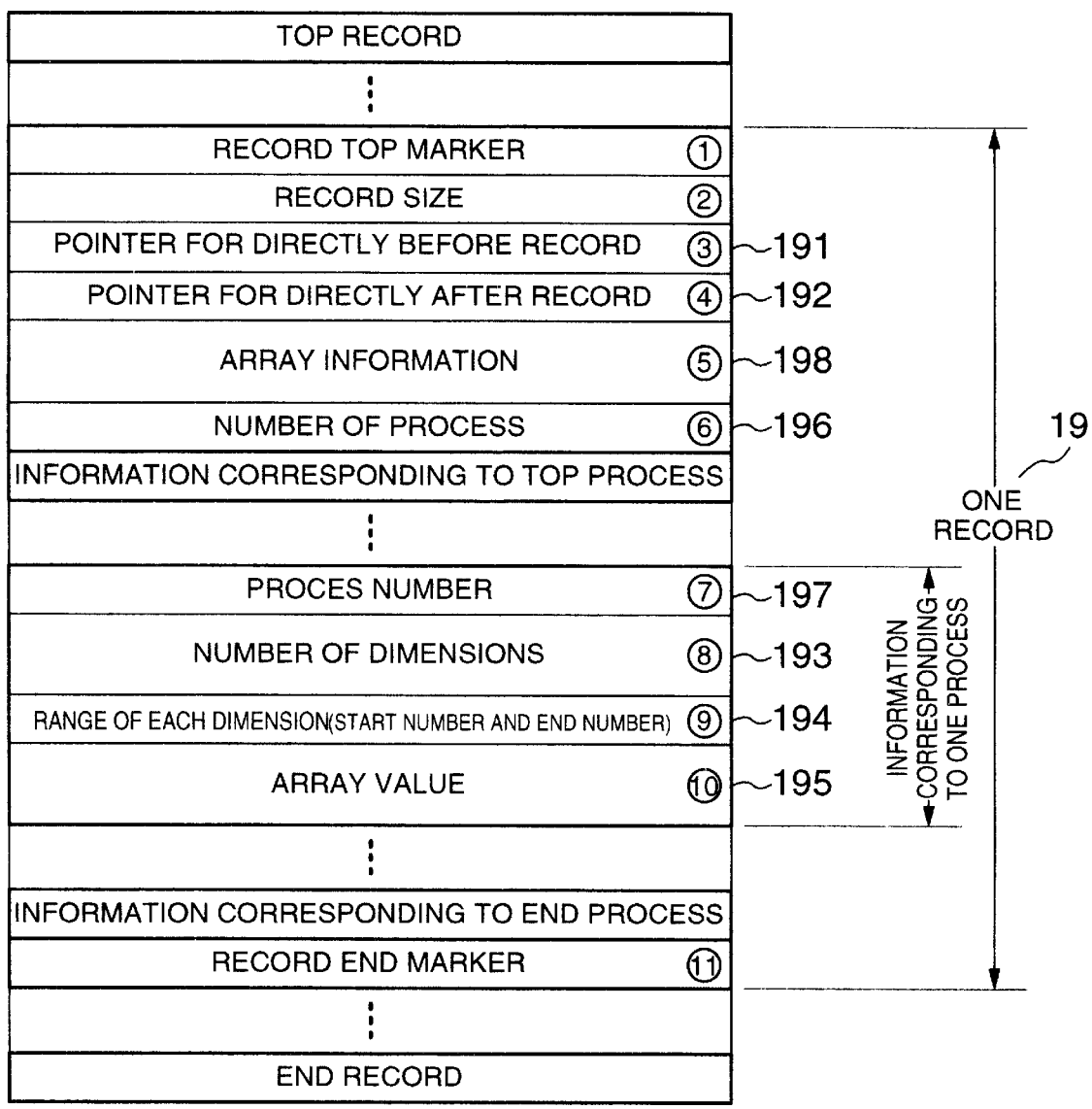
FIG. 11 is a diagram showing an example of the format of an array data save file for application to a plural-process system.

FIG. 11 shows an example of a file format for realizing the present embodiment by a computer such as a parallel computer composed of a plurality of processes. Difference from the example shown in FIG. 10 lies in that the items including the number of dimensions 193, the range of each dimension 194 (or the start and end numbers indicating a range of saved elements in each dimension) and the array value 195 are provided for each process and their items are repeated by the number of processes. In a distributed memory type of parallel computer, a high speed is attained in such a manner that one array is processed in such a manner that it is distributed to plural processes under user's deliberation. In debugging, the process numbers of one or plural distributional processes are also added in the instruction for array display at the breakpoint 710. Thus, the number of processes 196 and a process number 197 subjected to instruction for array display at the breakpoint 710 are added as file items. The other items are the same as those shown in FIG. 10.

With the format shown in FIG. 11, the display of data is enabled in the form of collective display as one array with no distribution, thereby affording convenience for a user. Also, options for enabling the display for each node and the collective display of some processes extracted from the whole may be provided as menus in the data display window 15, thereby making it possible to easily effect the switching between the collective display and the distributed display.

Since the format shown in FIG. 11 can be used even in the case of a single process, the user may get off without using the format shown in FIG. 10 or the proper use (or good command) of the formats shown in FIGS. 10 and 11 is possible.

In the case where a large scale array is handled, there results in that the capacity of the array data save file 8 becomes large and a large amount of disk resource is used. On the other hand, in considerably many cases, the actual debugging is made using simple numeric values (e.g., simple integers) as data at an initial stage of debugging. In many cases for simple numeric values, for example, the presence of about 3 digits in decimal notation suffices for a mantissa without using the numeric representation by 4 bytes, 8 bytes or 16 bytes. Thus, in the present embodiment, a data compression unit 504 is provided in the data save unit 503, thereby making it possible to effect data compression by lowering the accuracy in numeric value of the array value 195 in the array data save file 8.

Figure 12:
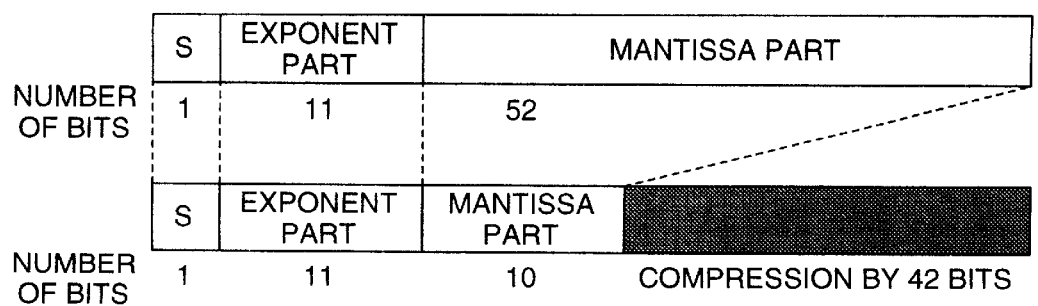
FIG. 12 is a diagram showing an example of data compression of an array value.

FIG. 12 shows an example of the compression of numeric value data in the array data save file 8. In the case of real type 8 bytes, it is represented by 64 bits including a symbol part of 1 bit, an exponent part of 11 bits and a mantissa part of 52 bits in a representation based on an IEEE format. Thus, the number of bits of the mantissa part is reduced down to 10 bits which are the minimum required for representing 3 digits in decimal notation. As a result, the compression by 42 bits from 52 bits to 10 bits is made. Since the compression by 42 bits per element is made, an array of 100×100 elements can be subjected to compression by 420,000 bits= 52,500 bytes. Similarly, real type 4 bytes and 16 bytes can be subjected to compression down to 19 bits and 26 bits, respectively.

For integer type (excepting integer type 2 bytes), it is once converted into real type 4 bytes and is thereafter subjected to the above-mentioned real type compression. As a result, integer type 4 bytes and 8 bytes can be subjected to compression down to 19 bits and 22 bits, respectively.

The rate of compression can further be enhanced by the combined use of the compression of redundant bits as in the case where there is the continuation of 0's. The compression of redundant bits are known by many references.

In the present compression method, a byte boundary is not defined for one element. Therefore, the type of data before compression and a compression code based on the encoding of the number of bits of mantissa after compression are provided in the array information 198, thereby making it possible to easily extract the contents of each element. Also, in the case where the end element in the array value 195 does not terminate at a byte boundary, NULL bits are added up to the byte boundary. For boundary adjustment, there can be employed a method in which a byte boundary is provided for every element (or each element is byte-bounded by itself).

In the example shown above, the mantissa part is reduced to 10 bits. However, an option at the time of file open is provided for making it possible to arbitrarily designate the number of bits of the mantissa part in accordance with a request from the user 6. This option enables the selection of one of non-compression (with the accuracy in numeric value unchanged) and the number of bits after compression. In the case where the latter is selected or the compression is made, it is possible to designate the number of bits after compression.

In the present compression method, the compression is made with the accuracy in numeric value of the array value 195 being lowered. Accordingly, the method is effective for the initial stage of program debugging or for the case where array data is displayed with no accuracy required, as in the case where array data is displayed in the form of a graph by use of the graph display control unit 512.

Figure 13:
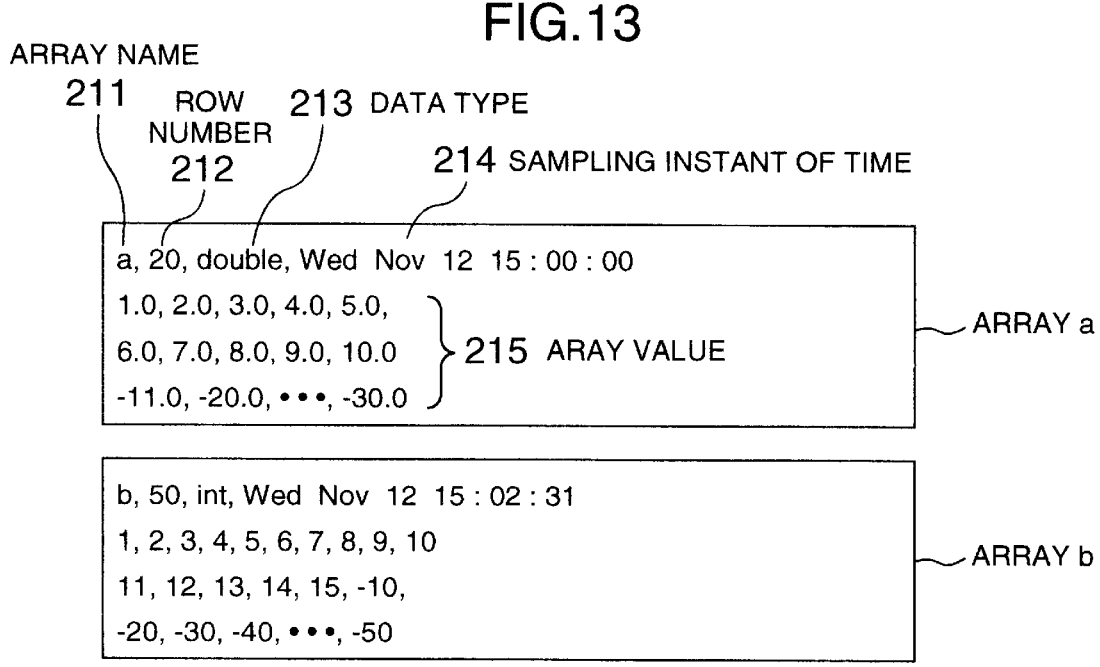
FIG. 13 is a diagram showing an example of CSV format data.

In order that array data saved in the array data save file 8 is used by another application without being processed, a CSV generation unit 513 is provided in the output control section 51. The user 6 selects that array data from the save array data table 181 in the display select window 18 which is to be converted into a CSV format. Next, the user 6 depresses a CSV button 1851 in the data maintenance field 185. When the CSV button 1851 is depressed, a CSV format file name designation field 1852 is activated to designate any file name. When the file name is designated, the CSV generation unit 513 extracts the values of array data selected from the array data save file 8 so that they are arranged in a form marked off by commas. Next, a numeric value is converted into a character string for conversion into a CSV format as shown in FIG. 13. A CSV format file 9 having the file name designated in the file name designation field 1852 is generated from data after CSV conversion.

FIG. 13 shows an example of the output in a CSV format generated by the above-mentioned means for the arrays a and b. The first row is outputted with array name 211, row number 212, data type 213 and sampling instant of time 214. Thereby, convenience is afforded for the management of the corresponding file by the user 6. The second and subsequent rows are outputted with array value 215 according to the CSV format. In an application such as table calculation software, the user 6 utilizes the contents of the first row as a title and the array data 215 in the second and subsequent rows as data.

In the first embodiment, since the acquisition and display of data can be performed in an asynchronous manner, as shown in the above, there is an effect that the efficiency of debugging of a program having a long executing time is improved. Also, the saving of sampled data provides an effect that the comparison before and after the modification of a program is possible, an effect that the array data can be displayed repeatedly any times, and an effect that the array data can be reused. Further, since the data compression of an array value of saved data is performed, there is an effect that a computer resource can be saved at an initial stage of debugging or in the case of graph display. Furthermore, the output of the contents of saved data into a CSV format file provides an effect that the data can be utilized by another application without being processed.

Figure 15:
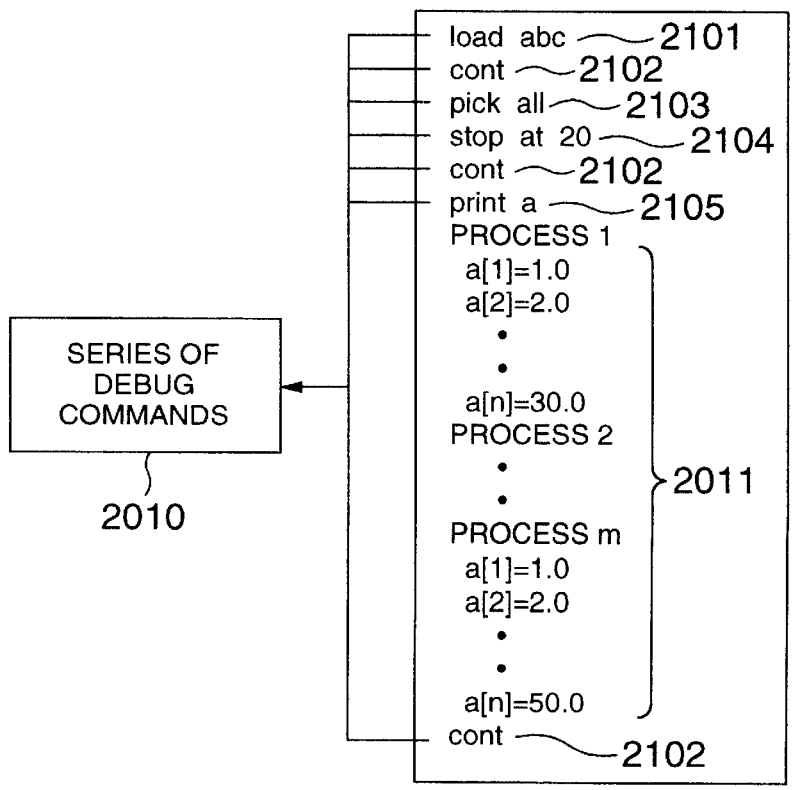
FIG. 15 is a diagram for explaining a display window showing an example of debug commands in the debugger and an example of the result of execution of the commands.

Next, a second embodiment of the present invention will be described. Prior to the description of the second embodiment, an example of operations performed when a source program 2701 as a multi-process program is debugged by use of the conventional debugger will be described using FIGS. 1, 14 and 15. In this example, the source program 2701, a load module 2702 and debug information 2703 correspond to the source program 701, the load module 702 and the debug information 703 shown in FIG. 1. FIG. 14 shows the flow of control and data in the debugger system 5 in an example of the debugger, and FIG. 15 shows an example of debug commands inputted by the user 6 from the keyboard 202 or the like and the result of execution of the commands.

When a program is to be debugged, the user 6 inputs a series of debug commands 2010 to debug the program in the following sequence.

(1) A load module 2702 corresponding to a source program 2701 of a program 7 to be debugged is loaded so that the program is brought into an executable condition. The corresponding command for this purpose is a command 2101.

In operation of the debugger at this time, the input command process unit 501 receives the command 2101. In accordance with the instruction of the command 2101, the debug operation unit 502 inputs the source program 2701 of the program 7 to be debugged, the load module 2702 and debug information 2703 generated by a compiler, thereby preparing for execution.

(2) Next, the program 7 to be debugged is progressed until a desired process is generated. The corresponding command is a command 2102. When a process to be subjected to a distributed processing in the program to be debugged is generated, the program 7 to be debugged is automatically broken in continuity or interrupted.

In operation of the debugger at this time, the command 2102 is received by the input command process unit 501 so that the program is executed until the process is generated and is brought into an executable condition.

(3) In order to refer to all of distributional arrays, all processes are made the object of debugging. The corresponding command is a command 2103.

In operation of the debugger at this time, the input command process unit 501 receives the command 2103 and the debug operation unit 502 saves information of the processes made the object of debugging (hereinafter referred to as debug object processes).

(4) In the source program 2701, a breakpoint 2710 is first set to the 20th row 2720 of the source program in order to refer to the contents of distributional arrays. (In general, the debugger can set a plurality of breakpoints. However, the description will be made in conjunction with one breakpoint.) The corresponding command is a command 2104.

In operation of the debugger at this time, the input command process unit 501 receives the command 2104 and the debug operation unit 502 saves breakpoint information.

(5) Next, the program is executed up to the set breakpoint 2710. The corresponding command is a command 2102.

In operation of the debugger at this time, the command 2102 is received by the input command process unit 501 so that the program of all the debug object processes is executed up to the breakpoint 2710 with the reference to the debug object process information saved in the operation of (3) and the breakpoint information saved in the operation of (4).

More particularly, the debugger executes the program of the debug object processes up to the 20th row upon reception of the command 2102.

(6) At the 20th row 2720, the contents of an array a are displayed. The corresponding program is a command 2105.

In operation of the debugger at this time, the command 2105 is received by the input command process unit 501 so that the reference to the contents of an array of the first debug object process is made from the load module 2702 and the debug information 2703 inputted in the operation of (1) and the debug object process information saved in the operation of (3). The contents referred to are displayed on the display unit 201 such as a display by display control unit 511. Similarly, the contents of arrays for all of the debug object processes designated by the command 2103 are displayed on the display unit 201 such as a display. A display result example 2011 corresponds to the representation of the contents of the array a in all the debug object processes as a character string. The array data may be saved in the array data save file 8 or the CSV format file 9 shown in FIG. 2.

Figure 16:
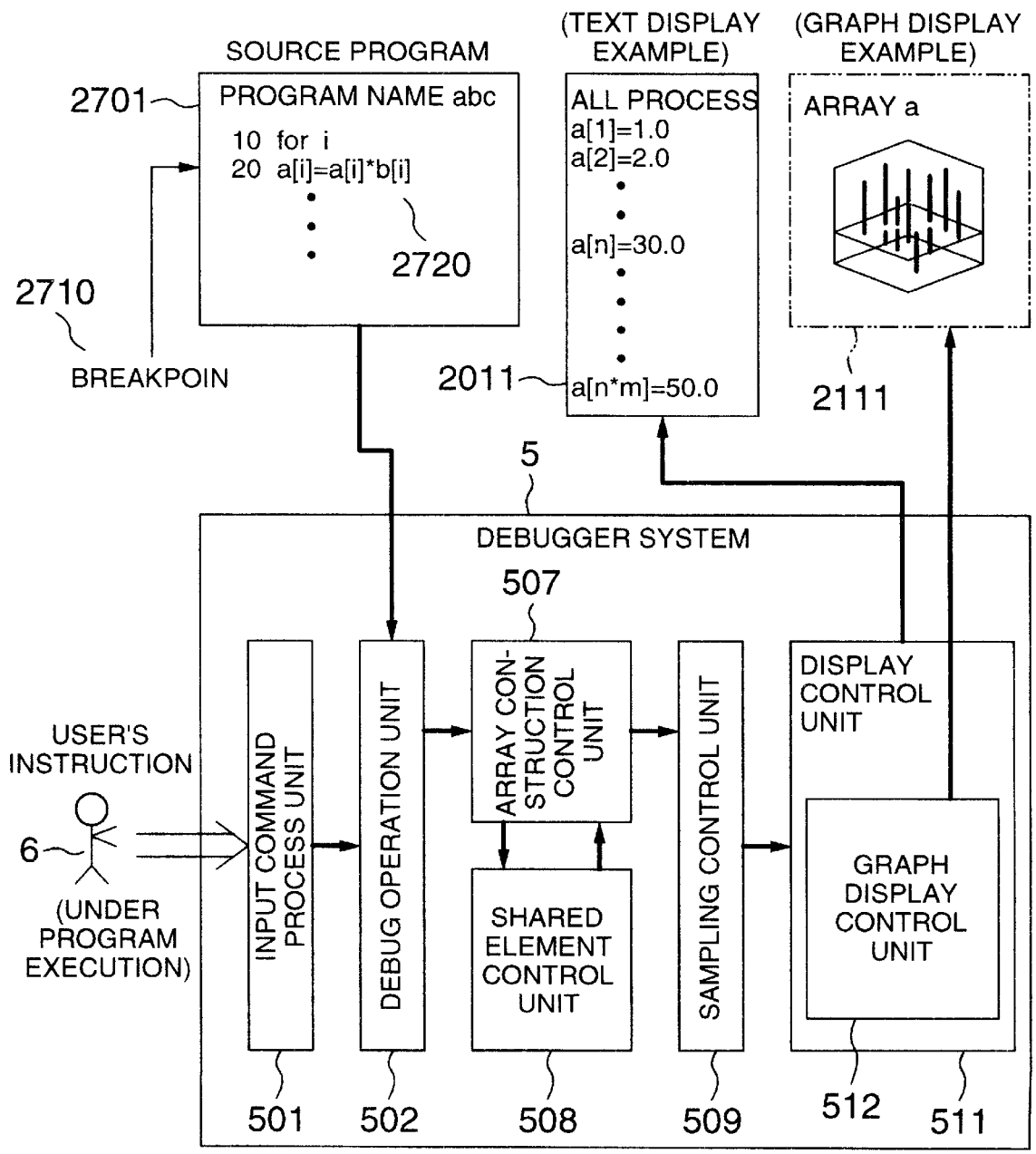
FIG. 16 is a diagram for explaining operations in a second embodiment of the present invention.

An example of operations performed in the present embodiment will be described using FIGS. 2, 16 and 17. Though the description of the present embodiment in the following will be made referring to FIGS. 2 and 16 in conjunction with the debugger system construction, it should be understood that the debugger system 5 in the present embodiment is practically realized by the construction shown in FIG. 16.

Figure 17:
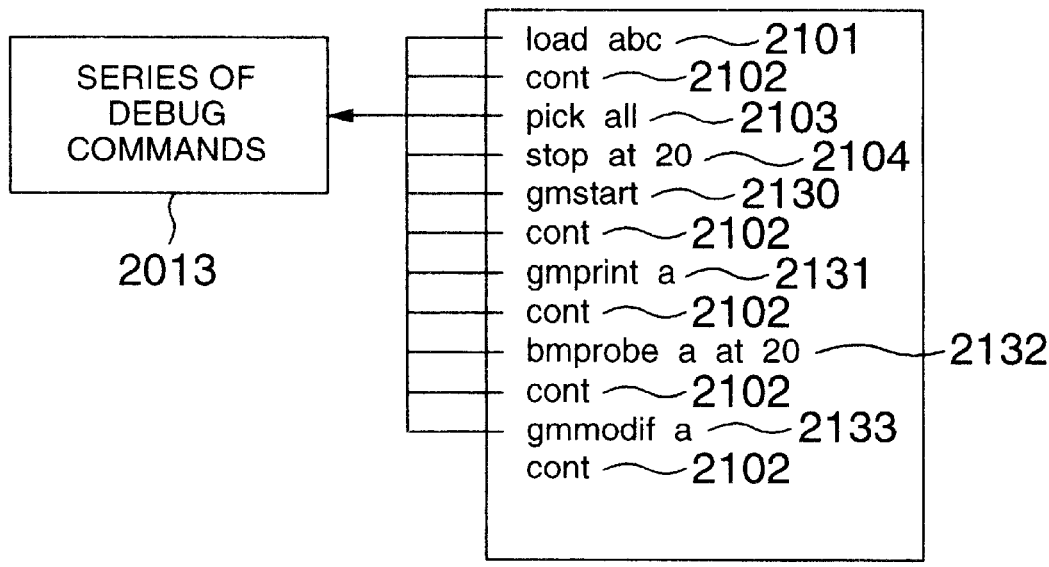
FIG. 17 is a diagram showing a window showing an example of debug commands for effecting the graph display of array data in the embodiment.
Figure 18:
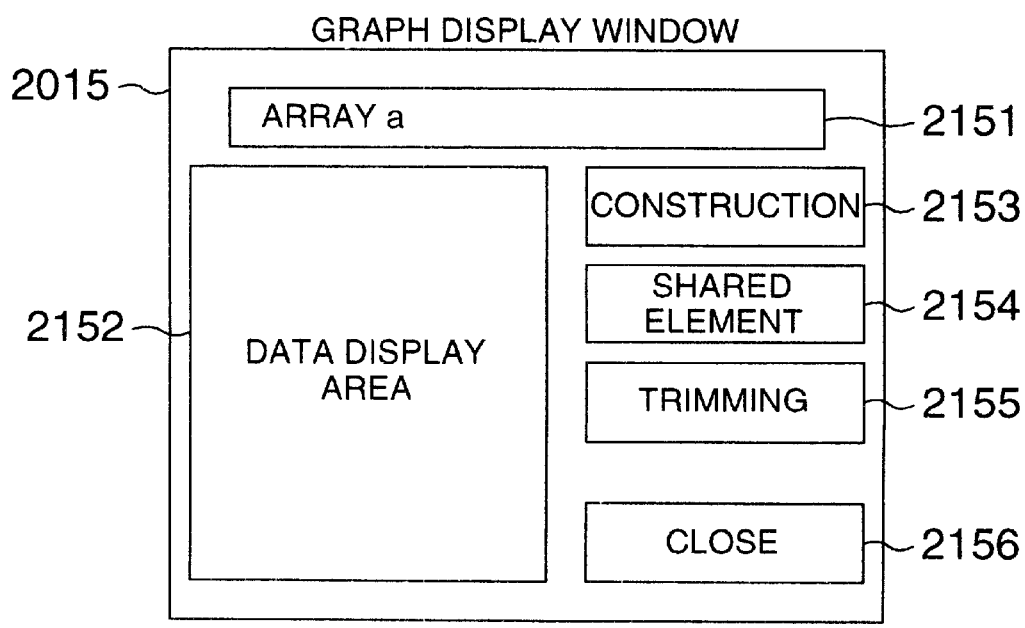
FIG. 18 is a diagram for explaining a window for graph display of a distributed array using GUI.
Figure 19:
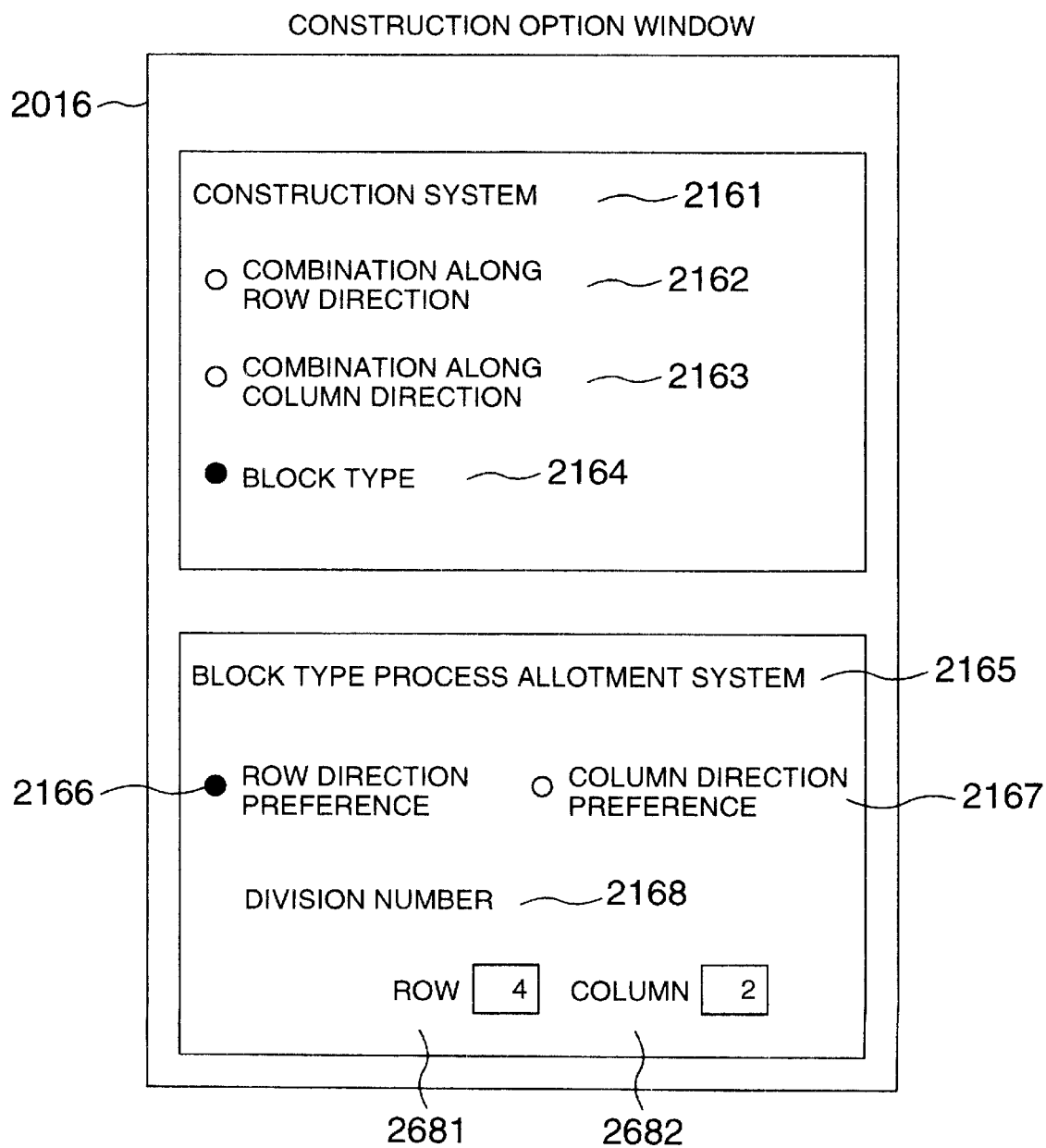
FIG. 19 is a diagram for explaining an option window for construction of a distributed array.

Though operations similar to the operations of (1) to (6) are performed, a user 6 inputs a series of debug commands 2013 shown in FIG. 17. Instructing commands 2101 to 2104 in the debug commands 2013 are the same as the instructing commands 2101 to 2104 in the debug commands 2010 shown in FIG. 15 and the same operations are performed by the debugger.

A command 2130 is a command for starting the present embodiment.

A command 2131 is an example of a command which is substituted for the conventional debug command 2105 for effecting the text display or file saving of array data for each debug object process in the operation of (6), that is, a command with which an array distributed to the debug object processes is constructed and the constructed array is displayed in the form of a graph.

A command 2132 is an example of a command with which the graph representing the designated array data a is updated each time the program to be debugged passes through the designated row number.

A command 2133 is an example of a command with which the graph is updated as in case of the command 2132 when the value of a designated variable (such as an array, the address of an area, or the like) to be monitored is updated. Of course, it is possible to separately designate a variable to be monitored and a variable to be graphically displayed and it is possible to designate the command 2132 and the command 2133 for the same array.

In the shown example, array data distributed to each process is constructed and graphically displayed, under debugging. However, the array data may be saved into the array data save file 8 or the CSV format file 9 once so that the display control unit 511 is started after program execution to display the saved array data in the form of a graph. Also, the designated array can be displayed in the form of a text (as shown by 2011 in FIG. 16) instead of the form of a graph (as shown by 2111).

In the shown example, new commands are added in distinction from commands in the conventional debugger. It is of course that the addition of new commands can be substituted by a method in which an added argument for the command 2104 is used or a method min which the optional designation of arguments at the time of debugger start and environmental variables, menus or the like is made.

Next, an example of a processing for designating an option for graph display under program execution will be described using FIGS. 2 and 16 to 19.

Though a method for designating an option using a GUI will now be described as means for designating an option for display of array data, a method for designating an option using a row of commands is also prepared to afford user's convenience.

In the case where the graph display control unit 512 is started under debugging in the debugger system 5, the user 6 inputs that command 2130 in commands 2013 which is provided for starting a graph display window 2015. In the graph display window 2015 are provided a field 2151 for displaying the array name of an array being graphically displayed at present, a data display area 2152 as a graph display area, buttons 2153 to 2155 for displaying option windows, and a button 2156 for closing the graph display window. In the debugger system 5, the control is transferred from the input command process unit 501 to the display control unit 511 so that the graph display window 2015 is displayed on the display unit 201. When the command 2131 is executed, the control is transferred from the input command process unit 501 to the display control unit 511 so that a graph is displayed on the data display area 2152 by the graph display control unit 2152.

Next, the description will be made of an example of the construction of an array distributed to a plurality of processes. When a CONSTRUCTION button 2153 in the graph display window 2015 is depressed, the display control unit 511 displays a construction option window 2016. A construction system 2161 is selected from options which include combination along row direction 2162, combination along column direction 2163 and block type 2164.

Difference in construction system depending on each option will be described using FIGS. 19 to 25.

Figure 20:
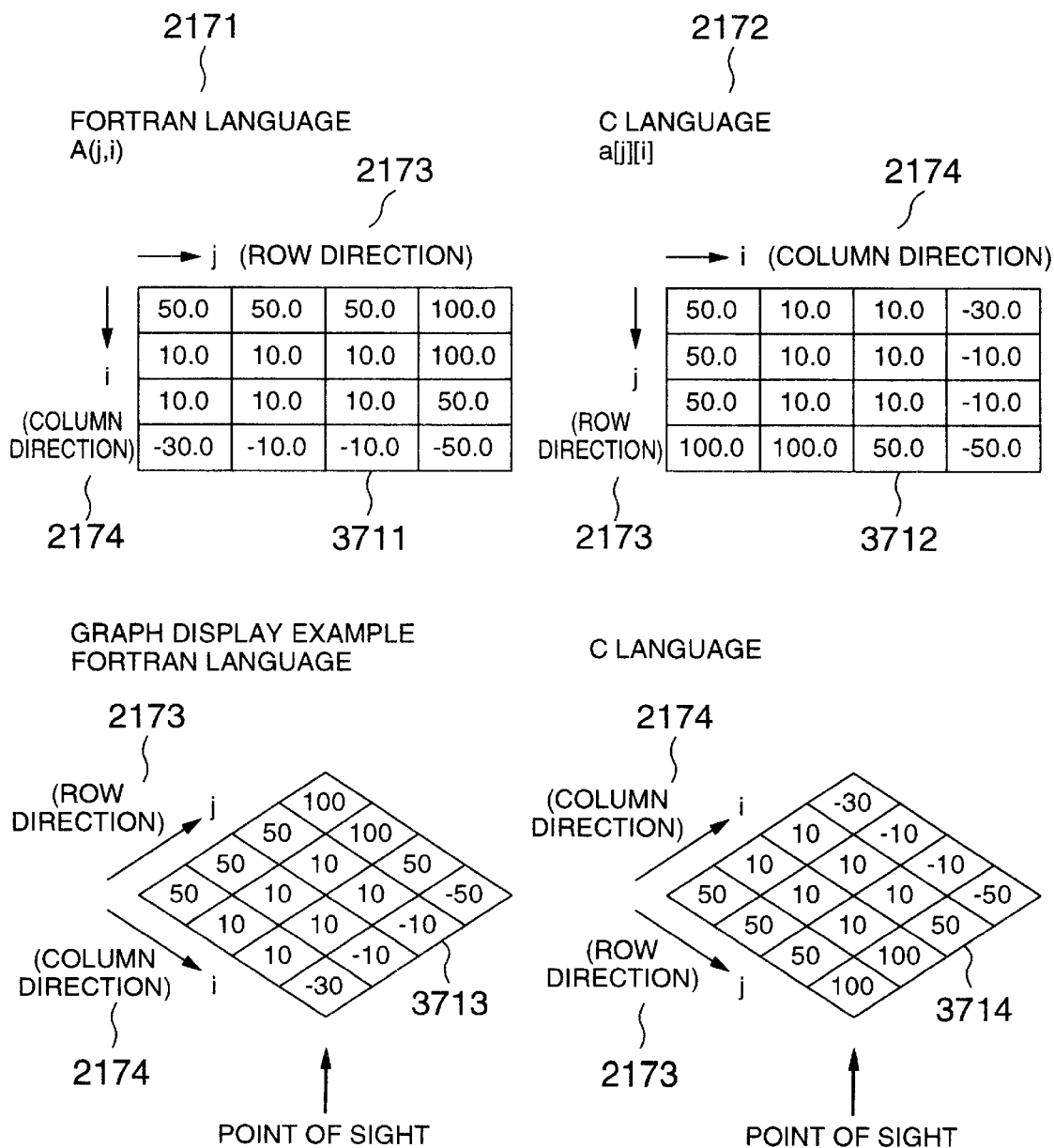
FIG. 20 is a diagram for explaining the difference in arrangement of an array on a memory depending on a language type.

FIG. 20 is a diagram for explaining a difference in arrangement of array data on a memory depending on a language type. The handling of subscripts for an array of a program to be debugged can be divided into FORTRAN language 2171 and C language 2172. The arrangement of elements on the memory is such that a FORTRAN language array 3711 is arranged in the sequence of A(1,1), A(2,1), - - - , A(j,1), A(1,2), A(2,2), - - - , A(j,i) and a C language matrix 3712 is allotted in the sequence of a[1][1] a[1][2], - - - , a[1][i] a[2][1], a[2][2], - - - , a[j][i]. The direction of change of the subscript f of each of the FORTRAN language 2171 and the C language 2172 is defined as a row direction 2173 and the direction of change of the subscript i is defined as a column direction 2174. When the elements are to be displayed in the form of a graph, those in the case of the FORTRAN language and those in the case of the C language are graphically displayed as shown by 3713 and 3714, respectively.

Figure 21:
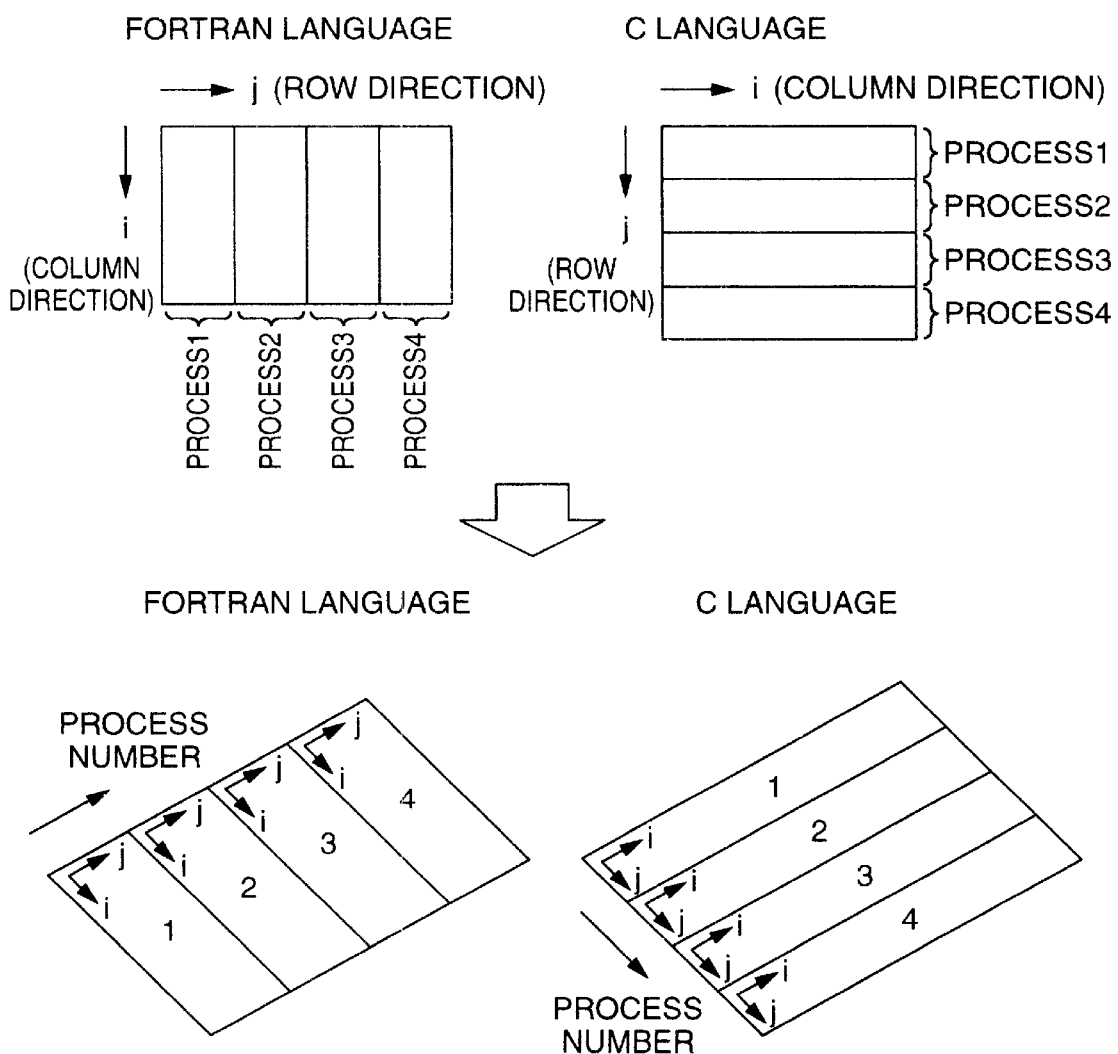
FIG. 21 is a diagram for explaining the case where an array is divided in a row direction.
Figure 22:
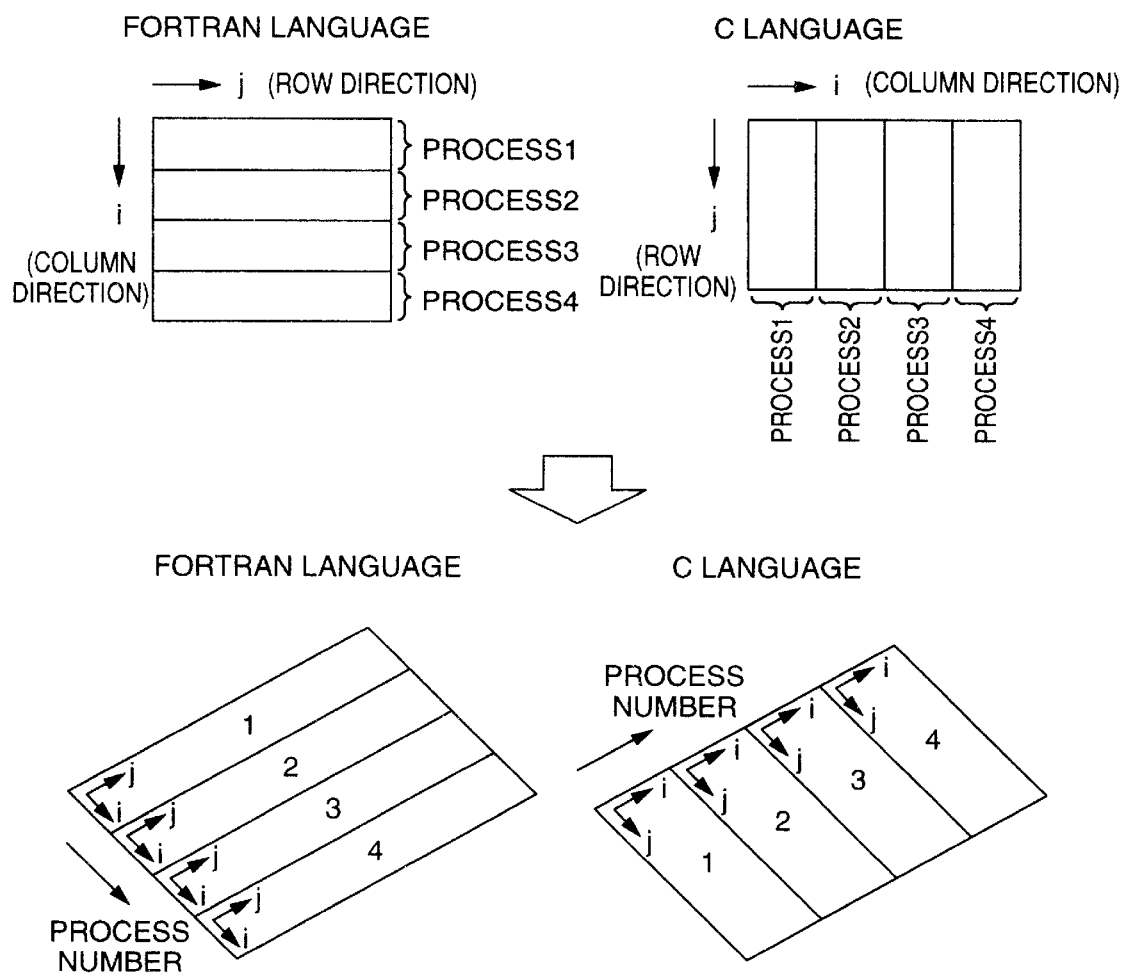
FIG. 22 is a diagram for explaining the case where an array is divided in a column direction.

When an array having processes based on the division in the row direction as illustrated by an example 2018 of division in row direction shown in FIG. 21 is constructed, a button for COMBINATION ALONG ROW DIRECTION 2162 is used. Similarly, when an array having processes based on the division in the column direction as illustrated by an example 2019 of division in column direction shown in FIG. 22 is constructed, a button for COMBINATION ALONG COLUMN DIRECTION 2163 is used. When an array divided in both the row and column directions is constructed, a button for BLOCK TYPE 2164 is used. The block type division includes a method in which processes are allotted to divisional blocks sequentially in the row direction as illustrated by an example 2020 of row direction preferred division shown in FIG. 23, and a method in which processes are allotted to divisional blocks sequentially in the column direction as illustrated by an example 2021 of column direction preferred division shown in FIG. 24. When the row direction preferred division example 2020 is to be constructed, an option 2167 of row direction preference is selected from a block type process allotment system 2165. When the column direction preferred division example 2021 is to be constructed, an option 2167 of column direction preference is selected.

Generally, the block division is such that the row direction and the column direction are divided by the square root of the number of all processes. However, it is possible to change a division number (or the number of divisional blocks) in the row or column direction to any value by designating division numbers into a row division number input field 2681 and a column division number input field 2682. FIG. 25 shows an example in which an array of a FORTRAN program is divided into 4 blocks in the row direction and 2 blocks in the column direction so that processes are allotted to the divisional blocks with the row direction preferred. In order to construct this block division, the block type 2164 in the construction option window 2016 is selected, the row direction preference 2166 of the block type process allotment system 2165 is selected, and 4 and 2 are designated into the row and column division number input fields 2681 and 2682 of division number 2168, respectively.

Figure 27:
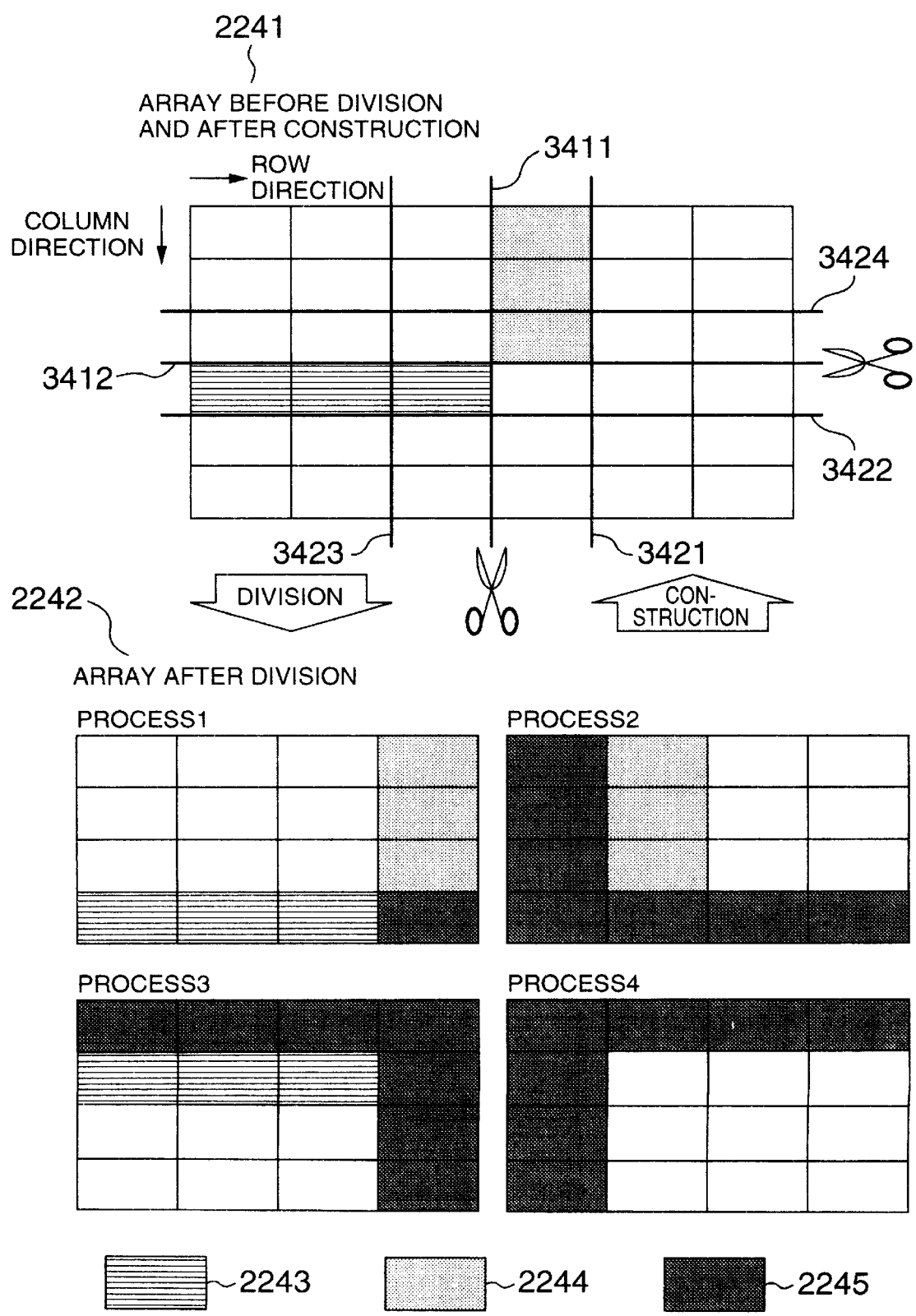
FIG. 27 is a diagram for explaining a system for division of an array with shared elements.

For a multi-process program, there may be the case where when an array is divided, adjacent arrays share elements with each other (or have shared elements). Using FIG. 27, the description will be made in conjunction with an example of division in the case where a 6-row×6-column array is divided into 4 parts with shared elements of one row and one column.

In the case where the division with no shared element is to be made, the array is divided by lines 3411 and 3412 so that a 3-row×3-column array is allotted to each process. However, in the case where the division with shared elements is to be made, an array for allotment to a process 1 is divided by lines 3421 and 3422. Similarly, the division for a process 2 is made by lines 3423 and 3422, the division for a process 3 is made by lines 3421 and 3424, and the division for a process 4 is made by lines 3423 and 3424. At this time, a portion 2243 of the process 1 is shared with a portion 2243 of the process 3, and a portion 2244 of the process 1 is shared with a portion 2244 of the process 2. Similarly, each of the processes 2, 3 and 4 shares a portion 2245 with the other process.

In the case of the division with shared elements, the 6-row×6-column array before division is distributed to 4 processes as 4-row×4-column arrays, as shown by an array 2242 after division.

If the array 2242 after division having shared elements is simply constructed, there results in an 8-row×8-column array which is different from the array 2241 before division. Thus, in the present embodiment, the debugger system 5 is provided with the shared element control unit 508 as means for effecting the construction from the array 2242 after division with the shared elements removed.

A method for designating an option for construction of an array divided with shared elements will be described using FIG. 26. When a button for SHARED ELEMENT 2154 in the graph display window 2015 is depressed, a shared element option window 2023 is displayed. In the shared element option window 2023, the number of shared columns 2232 for designating the number of columns shared in the row direction and the number of shared rows 2233 for designating the number of rows shared in the column direction are designated as the number of shared elements 2231, thereby enabling the construction with the shared elements removed.

The shared element control unit 508 receives the number of shared columns 2232 and the number of shared rows 2233 designated by the shared element option window 2023 and the array after division provided from the array construction control unit 507 and returns the array to the array construction control unit 507 after removal of the shared elements therefrom. Also, it is possible to compare the values of the shared elements so that the result of comparison is graphically displayed.

Figure 28:
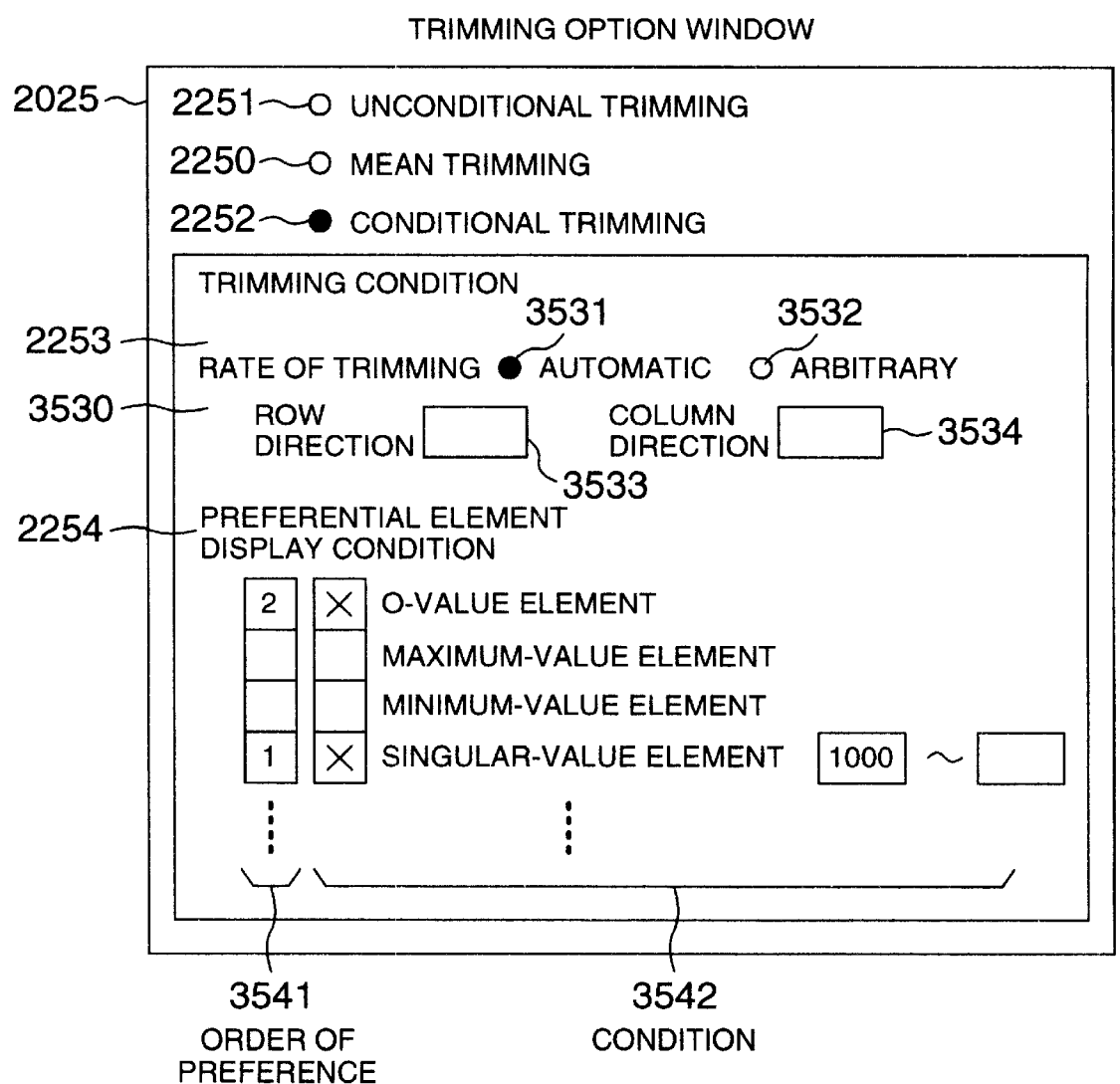
FIG. 28 is a diagram for explaining a trimming option window.

FIG. 28 shows a sampling option window 2025 displayed when a button for TRIMMING 2155 in the graph display window 2015 is depressed. A method for trimming elements to be displayed can be designated in the trimming option window 2025.

The display element trimming system will be described using FIGS. 28 to 32. In the case where a large scale array is to be displayed, the graph display is made with array elements extracted by the number thereof capable of being practically displayed. For example, consider the case where the display area of the display unit 201 includes 640×480 dots (though the size of the display area of a display unit differs depending on a connected or used display unit). If a try is made to display an array of 1000×1000 elements on the display screen as it is, it is not possible to display all of the 1000×1000 elements. Also, even if the array is forcibly displayed, there results in that adjacent elements overlap so that a graph is not correctly displayed. Thus, a number with which the overlapping of adjacent elements is not generated even in the case where the graph is rotated, is defined as the number of elements capable of being practically displayed. In the shown example, this number is denoted by the number of display possible elements 2261.

The method for trimming array elements to be displayed is prepared with three types as follows:

(1) unconditional trimming with which elements are displayed with them trimmed at equal intervals;

(2) group trimming (or conditional trimming) with which elements excepting elements satisfying a predetermined condition are trimmed off from a trimming group defined by a square matrix having one side equal to the rate of trimming; and (3) mean trimming with which elements are trimmed so that the form of a graph before trimming and the form of a graph after trimming have no change from each other.

Figure 29:
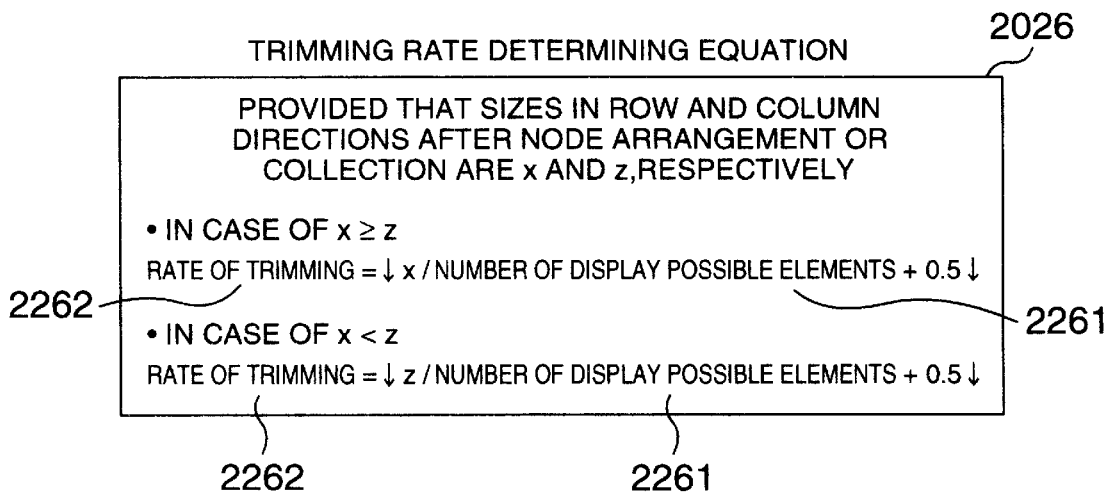
FIG. 29 shows a trimming rate determining equation.
Figure 30:
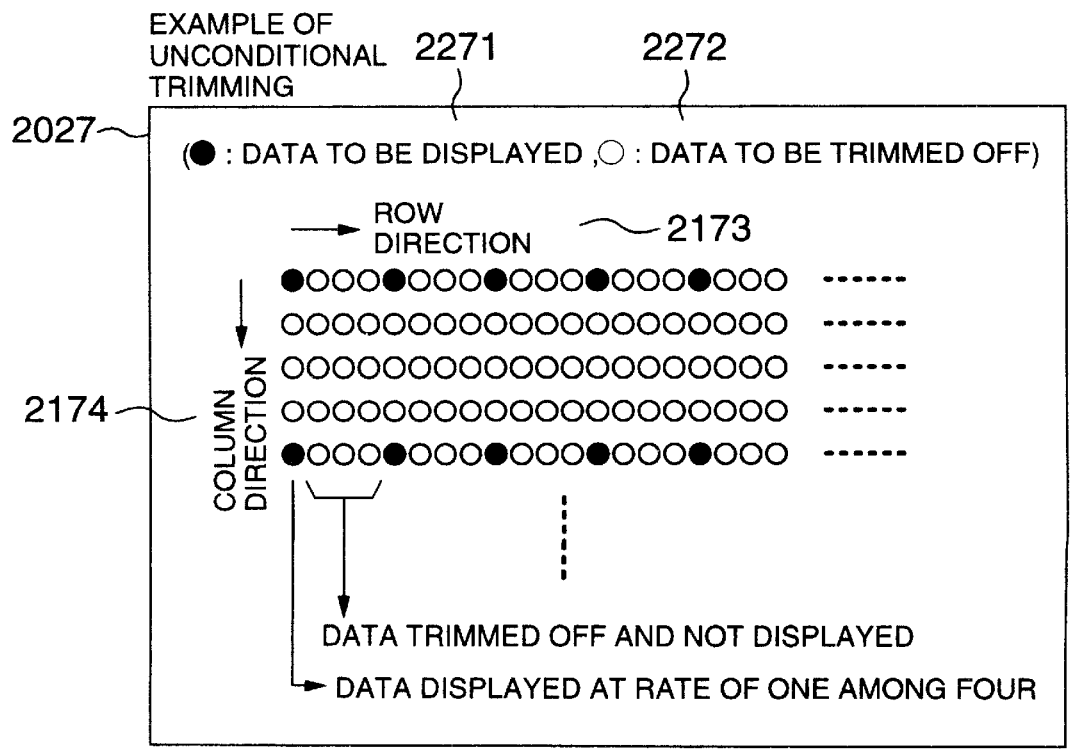
FIG. 30 is a diagram for explaining the case where unconditional trimming is performed.

When UNCONDITIONAL TRIMMING 2251 is designated in the trimming option window 2025, the graph display is made with the type (1) of unconditional trimming. An example of the unconditional trimming system will be described using FIGS. 29 and 30. The unconditional trimming is performed in the case where the number of elements in any one of a row direction 2173 and a column direction 2174 exceeds the number of display possible elements 2261. In this case, the rate of trimming 2262 is determined in accordance with a trimming rate determining equation 2026. In both the row direction and the column direction, one element for each rate of trimming 2262 is arbitrarily displayed with the other elements trimmed off. FIG. 30 shows an example of unconditional trimming in the case where the number of elements in the row direction is 256, the number of elements in the column direction is 128 and the number of display possible elements is 64. According to the trimming rate determining equation 2026, the rate of trimming 2262 comes to 4. One among four elements in each of the row direction 2173 and the column direction 2174 is displayed as data to be displayed 2271.

Figure 31:
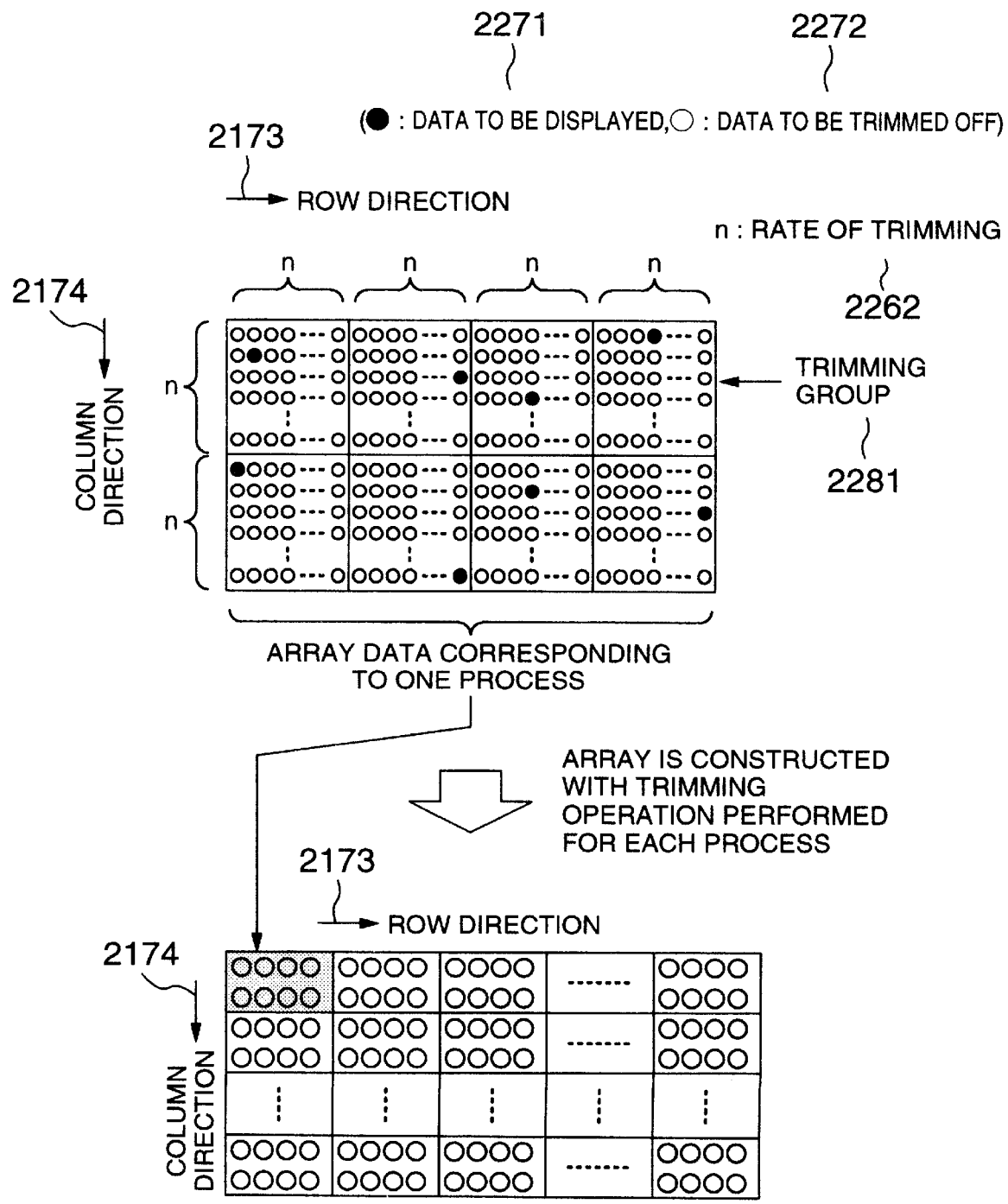
FIG. 31 is a diagram for explaining a trimming system in the case where a trimming group is automatically determined.
Figure 32:
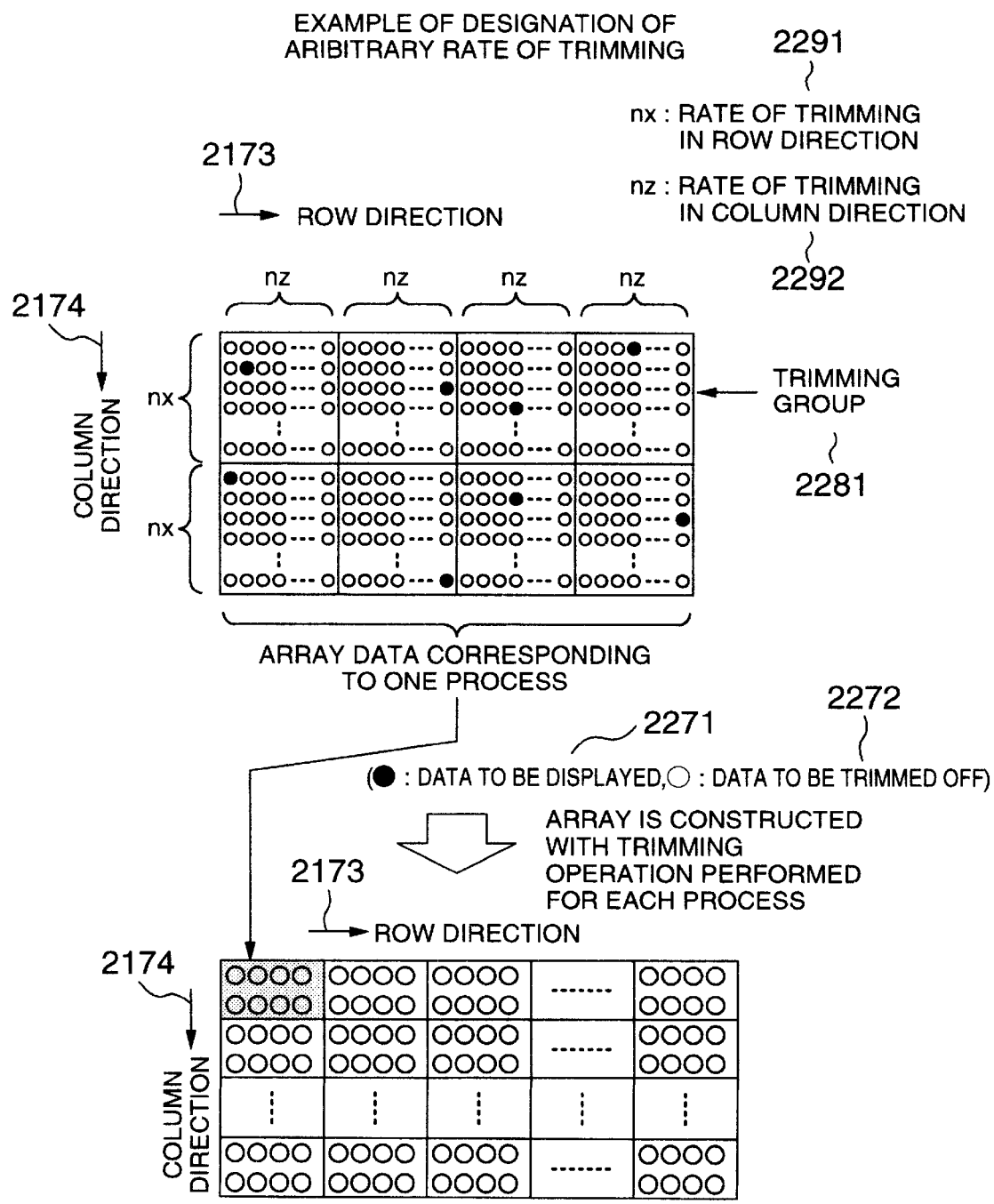
FIG. 32 is a diagram for explaining a trimming system in the case where the rates of trimming are arbitrarily designated.

Next, an example of conditional trimming will be described using FIGS. 29, 31 and 32. When CONDITIONAL TRIMMING 2252 is selected in the trimming option window 2025, the type (2) of conditional trimming is assumed so that the designation of a trimming condition 2253 for conditional trimming becomes available. In the case where AUTOMATIC 3531 for the rate of trimming 3530 is selected, the rate of trimming 2262 is determined by use of the trimming rate determining equation 2026. A trimming group 2281 is defined by a matrix having one side equal to the determined rate of trimming 2262. Elements in the trimming group 2281 satisfying conditions designated by a preferential element display condition 2254 are graphically displayed as data to be displayed 2271.

In the case where ARBITRARY 3532 for the rate of trimming 3530 is selected, the trimming is performed at the rates of trimming in the row and column directions which are determined by values designated in a field 3533 for input of the rate of trimming in row direction 2291 and a field 3534 for input of the rate of trimming in column direction 2292.

Next, the description will be made of a method for designating elements to be subjected to preferential display. When data to be displayed 2271 is sampled from a sampling or trimming group 2281, elements designated by the preferential element display condition 2254 are taken as data to be displayed if they exist in the trimming group 2281. Also, user's convenience is afforded for enabling the combination of conditions by selecting plural conditions 3542 as the preferential element display condition 2254 with the order of preference 3541 applied thereto. The preferential element display condition 2254 may include the display of 0 value, the display of maximum value, the display of minimum value, the display of singular value, the display of maximum value of absolute value, the display of any value, and so forth.

When MEAN TRIMMING 2250 in the trimming option window 2025 is selected, the rate of trimming 2262 is determined by the trimming rate determining equation 2026 and the mean value of elements in a trimming group 2281 is graphically displayed as data to be displayed 2271. Thereby, a graph having the same form as that before trimming can be displayed at a high speed.

Figure 33:
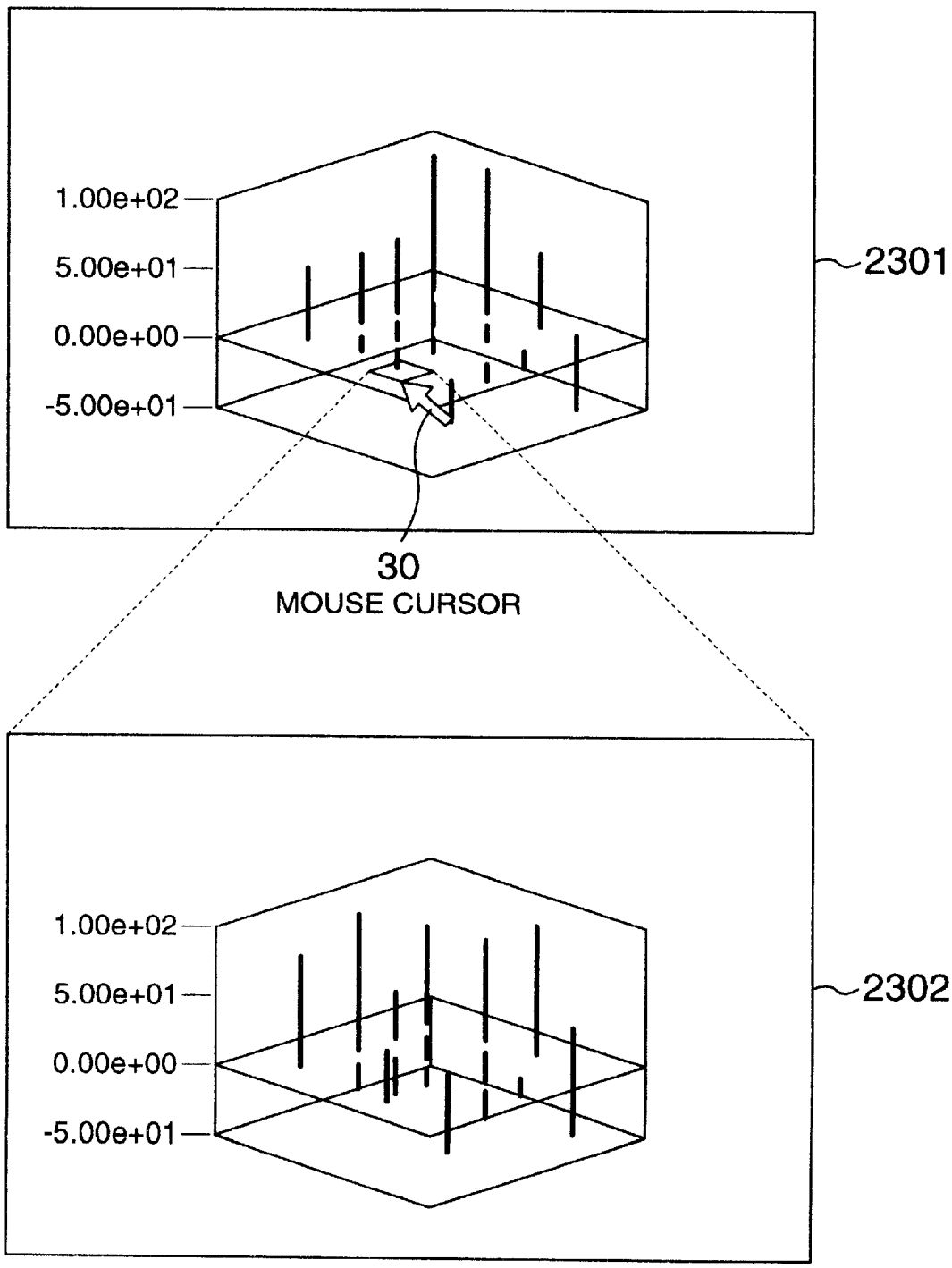
FIG. 33 is a diagram for explaining the case where a graph is displayed in an enlarged form.

Using FIGS. 29 and 33, the description will be made of a method for displaying elements which are trimmed off in a graph displayed using the above-mentioned trimming system. The designation of any element by a mouse cursor 30 is made on a file data corresponding to a displayed graph 2301 by use of a pointing unit such as the mouse 203 and the keyboard 202 or the like so that elements undisplayed due to the trimming operation are graphically displayed in an enlarged form 2302. At this time, in the case where the rate of trimming 2262 at the time of display of the graph 2301 is greater than the number of display possible elements 2261 when the form 2302 is to be graphically displayed, a trimming operation as mentioned above is performed for graph display.

With the application of the present embodiment, a distributed array in a multi-process program is automatically constructed and the constructed array is displayed in the form of a graph at a high speed, thereby providing an effect that the efficiency of debugging is improved. Also, there is an effect that the efficiency of debugging is improved by checking portions shared between distributional arrays at the time of array construction to detect an abnormality of the constructed array and displaying the result of check graphically. Especially, there is an effect that since the form of array data can immediately be confirmed through visual observation even in the course of debugging, a time required for specifying the location of irregular data is reduced, thereby making it possible to improve the efficiency of debugging. In the case of graph display of a large amount of data, there is an effect that since the trimming is performed while conditions of data to be positively left are set as a trimming condition for data to be displayed, the graph display can be performed at a high speed with necessary data displayed, thereby improving the efficiency of debugging. Further, there is an effect that the efficiency of debugging is improved since it is possible to graphically confirm a change in array by automatically updating a graph each time a breakpoint is passed and when array data is updated. Accordingly, there is an effect that since a distributed array in a multi-process program is constructed and is graphically displayed, the efficiency of debugging is improved.

What is claimed is:

1. A debugger for supporting the debugging of a program, comprising:
   an array data save file in which array data in said program is to be saved;
   a data save unit for receiving an instruction for the saving of array data in said program at a predetermined position and saving the array data at said predetermined position into said array data save file in time series; and
   a data display unit operable asynchronously with said array data save file for displaying the array data saved in said array data save file.

2. A debugger for supporting the debugging of a program, comprising:
   data savings means for saving array data in said program; and
   data displaying means operative asynchronously with said data save means for displaying the array data saved in said data saving means, the array data being displayed in the form of a graph.

3. An array data displaying method in a debugger which supports the debugging of a program, the method comprising:
   saving array data in said program when the debugging of said program is being performed; and
   displaying the saved array data asynchronously with the debugging of said program, the array data being displayed in the form of a graph.

4. An array data displaying method in a debugger which supports the debugging of a program, the method comprising:
   saving array data in said program when the debugging of said program is being performed; and
   displaying the saved array data asynchronously with the debugging of said program,
   wherein the saving of said array data is made using a save format which includes at least one of the number of dimensions of said array data and a start element number and an end element number of elements in each dimension of said array data.

5. An array data displaying method according to claim 4, wherein when said array data is saved, a switching is possible between a method in which the array data is saved in accordance with a data format used by said program and a method in which the array data is saved in accordance with a data format shorter than the data format used by said program.

6. An array data displaying method according to claim 5, wherein the saved array data is outputted to a CSV format file.

7. An array data displaying method in a debugger which supports the debugging of a program, the method comprising:
   saving array data in said program when the debugging of said program is being performed; and
   displaying the saved array data asynchronously with the debugging of said program,
   wherein when said array data is saved, a part or the whole of said array data is saved as one record by use of an array data save format which includes at least one of a saving position of a record directly before said one record and a saving position of a record directly after said one record.

8. An array data displaying method according to claim 7, wherein when said array data is saved, a switching is possible between a method in which the array data is saved in accordance with a data format used by said program and a method in which the array data is saved in accordance with a data format shorter than the data format used by said program.

9. An array data displaying method according to claim 8, wherein the saved array data is outputted to a CSV format file.

10. A recording medium in which an array data displaying program in a debugger for supporting the debugging of a program is recorded, said array data displaying program comprising:

saving array data in said program when the debugging of said program is being performed, the saving of said array data being made using a save format which includes at least one of the number of dimensions of said array data and a start element number and an end element number of elements in each dimension of said array data; and displaying the saved array data asynchronously with the debugging of said program.

11. A debugger for supporting the debugging of a multi-process program, comprising:

array constructing means by which array data in said program distributed to each process is constructed into array data based on array designation; and graph displaying means by which the array data constructed by said array constructing means is displayed in the form of a graph.

12. An array data displaying method in a debugger which supports the debugging of a multi-process program, the method comprising:

a first step in which array data in said program distributed to each process is constructed into array data before distribution to each process; and a second step in which the constructed array data is displayed in the form of a graph, the displaying being performed asynchronously with the debugging of said multi-process program.

13. An array data displaying method in a debugger which supports the debugging of a multi-process program, the method comprising:

a first step in which array data in said program distributed to each process is constructed into array data before distribution to each process; and a second step in which the constructed array data is displayed in the form of a graph, wherein said first step includes a step of discriminating that difference in arrangement of array data on a memory which depends on the type of a language of the program to be debugged.

14. An array data displaying method in a debugger which supports the debugging of a multi-process program, the method comprising:

a first step in which array data in said program distributed to each process is constructed into array data before distribution to each process; and a second step in which the constructed array data is displayed in the form of a graph, wherein said first step includes a step of removing portions shared between the array data distributed to the respective processes.

15. An array data displaying method according to claim 14, wherein said removing step includes a step of checking whether or not the portions shared between the array data distributed to the respective processes match with each other.

16. An array data displaying method according to claim 15, further comprising a step of displaying the result of check.

17. An array data displaying method in a debugger which supports the debugging of a multi-process program, the method comprising:

a first step in which array data in said program distributed to each process is constructed into array data before distribution to each process;

a second step in which the constructed array data is displayed in the form of a graph;

monitoring predesignated array data;

monitoring the passage through a predesignated breakpoint in said program; and updating the displayed graph each time the value of the monitored array data is changed and updating the displayed graph in association with the passage through said breakpoint.

18. An array data displaying method in a debugger which supports the debugging of a multi-process program, the method comprising:

a first step in which array data in said program distributed to each process is constructed into array data before distribution to each process;

a second step in which the constructed array data is displayed in the form of a graph; and monitoring predesignated array data, and a step of updating the displayed graph each time the value of the monitored array data is changed.

19. An array data displaying method in a debugger which supports the debugging of a multi-process program, the method comprising:

a first step in which array data in said program distributed to each process is constructed into array data before distribution to each process; and a second step in which the constructed array data is displayed in the form of a graph, wherein said second step includes a step of selecting that array data of said constructed array data which is to be displayed in the form of a graph, and said selecting step includes a step of discriminating array data which does not give a large influence on the form of the graph before and after the selection of the array data to be displayed.

20. An array data displaying method according to claim 19, wherein said second step includes a step of displaying any designated portion of array data in an enlarged form, and when said designated array data portion is displayed in the enlarged form, array data selected in said selecting step and array data unselected in said selecting step are displayed.

21. A recording medium in which an array data displaying program in a debugger for supporting the debugging of a multi-process program is recorded, said array data displaying program comprising:

a first step in which array data in said program distributed to each process is constructed into array data before distribution to each process;

a second step in which the constructed array data is displayed in the form of a graph; and monitoring predesignated array data, and a step of updating the displayed graph each time the value of the monitored array data is changed.

* * * * *